(12) United States Patent
Kogure

(10) Patent No.: US 7,693,536 B2
(45) Date of Patent: Apr. 6, 2010

(54) BASE STATION, MOBILE STATION AND CONTROL METHOD THEREFOR

(75) Inventor: Yuki Kogure, Tokyo (JP)

(73) Assignee: NEC Corporation, Tokyo (JP)

( * ) Notice: Subject to any disclaimer, the term of this patent is extended or adjusted under 35 U.S.C. 154(b) by 1020 days.

(21) Appl. No.: 11/213,845

(22) Filed: Aug. 30, 2005

(65) Prior Publication Data
US 2006/0046765 A1 Mar. 2, 2006

(30) Foreign Application Priority Data
Sep. 1, 2004 (JP) .............................. 2004-253927

(51) Int. Cl.
*H04B 7/00* (2006.01)
(52) U.S. Cl. ..................... 455/522; 455/67.11; 370/465
(58) Field of Classification Search ............... 455/67.11, 455/522
See application file for complete search history.

(56) References Cited

U.S. PATENT DOCUMENTS

| 6,671,514 | B1 | 12/2003 | Cedervall et al. | |
|---|---|---|---|---|
| 2002/0082036 | A1* | 6/2002 | Ida et al. ...................... | 455/522 |
| 2004/0005906 | A1* | 1/2004 | Okumura et al. ............. | 455/522 |
| 2004/0102159 | A1* | 5/2004 | Suda et al. ................ | 455/67.11 |
| 2005/0164633 | A1* | 7/2005 | Linjama et al. ............. | 455/41.2 |

FOREIGN PATENT DOCUMENTS

| JP | 10-112683 A | 4/1998 |
|---|---|---|
| JP | 2001-217774 A | 8/2001 |
| JP | 2001-244878 A | 9/2001 |
| JP | 2003-163630 A | 6/2003 |
| JP | 2003-520532 A | 7/2003 |
| JP | 2003-338786 A | 11/2003 |
| WO | WO 99/37111 A1 | 7/1999 |

OTHER PUBLICATIONS

3GPP TS 25.214 V3.12.0 (Mar. 2003), $3^{rd}$ Generation Partnership Project; Technical Specification Group Radio Access Network; Physical layer procedures (FDD) (Release 1999); pp. 1-5 and 11-27.
"Supekutoramu Kakusan Guyutsu No Subete"; Matsuo Kenichi, Tokyo Denki University Press, May 30, 2002, pp. 230-231.

* cited by examiner

*Primary Examiner*—Matthew D Anderson
*Assistant Examiner*—Adel Youssef
(74) *Attorney, Agent, or Firm*—Sughrue Mion, PLLC

(57) ABSTRACT

An exemplary method for a communication network according to the present invention includes detecting movement of a mobile station, and modifying a control for the communication network based on the detection of the movement. In an exemplary embodiment, a transmit power control may be increased or decreased based the movement of the mobile station which is detected. Further, the network may determine a base station among plurality of base stations which provides the best communication path, taking into account a movement state of the mobile station. Accordingly, a stable hand over process may be realized, providing favorable communication quality and minimizing the occurrence of disconnection of the mobile terminal from a base station.

24 Claims, 8 Drawing Sheets

BASE STATION, MOBILE STATION AND CONTROL METHOD THEREFOR

This application claims priority to Japanese Patent Application 2004-253927, the disclosure of which is incorporated herein by reference.

BACKGROUND OF THE INVENTION

1. Technical Field

The present invention relates to a transmit power control method in a wireless communication system, and a base station and a mobile station used for the transmit power control.

2. Background Art

Terminals (wireless communication terminals) for wireless communication, such as mobile phones, PHS, PDA, pagers or wireless LAN connection devices have become popular, and increased expansion of service areas for the wireless communication and more diversification of services are expected.

There are various types of wireless communication system based on wireless communication technology, such as the TDMA (Time Division Multiple Access) system and the CDMA (Code Division Multiple Access) system. Here, the CDMA system will be described as a representative thereof.

In the wireless communication system based on CDMA, communication is conducted in the following manner. First, an apparatus on the sending side spreads a transmission signal by using a spreading code assigned to a user on the sending side and then transmits the spread signal. An apparatus on the receiving side receives the transmission signal and despreads the received signal in order to restore the original signal by using the same spreading code as the spreading code assigned to the sending side user.

In the CDMA system, since it is possible to distinguish each communication entity of a plurality of communication entities by using different spreading codes that are orthogonal with each other, a plurality of communication entities can use a radio signal of the same frequency.

However, it is difficult to completely preserve the orthogonality of all of the spreading codes used, and in practice the respective despread codes are not completely orthogonal with each other and have components that correlate with other codes. These correlating components constitute interference components at the time of communication, causing deterioration in communication quality. Accordingly, as the number of communication entities increases, the interference also increases.

Further, in wireless communication systems in general, information transmission is conducted through a base station and not by a direct connection between mobile stations (corresponding to wireless communication terminals). Hence, a situation arises in which a signal from a mobile station that is close to a base station imparts interference to a faint signal of a mobile station located at a distance from the base station. In the CDMA system, the transmission power of mobile stations is controlled in order to prevent deterioration of communication quality due to this problem (known as the "far-near problem").

3GPP TS 25.214 V3.12.0, p11-21 (Apr. 4, 2003) shows an uplink power control in W-CDMA (Wideband-CDMA: one of IMT-2000) as an example. A base station controls transmission power of each mobile station so that the Eb/IO (desired reception wave energy per bit (Eb) to noise and interference wave power (IO) ratio) or SIR (Signal to Interference ratio) for a communication link established between the respective mobile stations is high enough to secure a predetermined minimum communication quality. More specifically, a downlink signal transmitted from the base station to a mobile station includes TPC (Transmit Power Control) information for instructing the mobile station to increase or decrease the transmission power of a signal transmitted to the base station. When the SIR of a signal received from the mobile station is below a minimum value which is necessary to secure the predetermined minimum communication quality, the base station transmits TPC information instructing the mobile station to increase the transmission power to the mobile station. Conversely, when SIR of a signal received from the mobile station is greater than the minimum value, the base station transmits TPC information instructing the mobile station to decrease the transmission power to the mobile station. SIR of a reception signal is one criterion that indicates the radio communication quality. Based on the TPC information received from the base station, the mobile station controls the transmission power of a signal to the base station.

3GPP TS 25.214 V3.12.0, p21-27 (Apr. 4, 2003) shows transmit power control for transmit power of downlink signals. That is, an uplink signal transmitted to the base station from the mobile station includes TPC information to instruct the base station to increase or decrease the transmission power of signals transmitted to the mobile station, and the base station controls the transmission power of signals to the mobile station based on the TPC information received from the mobile station.

In a wireless communication system in which different frequencies are used for each base station, communication will be interrupted during a handover procedure (i.e., function that continues communication by automatically switching base stations due to movement of a mobile station) due to frequency switchover. In the handover procedure, the mobile station continues communication by automatically switching a base station as it moves.

However, in the W-CDMA system, since a base station uses a signal of the same radio frequency, it is not necessary for a mobile station to perform a frequency switchover during a handover. Hence, in the W-CDMA system, it is possible to perform a soft handover (SHO) in which a handover is possible without interrupting communication of the mobile station (SUPEKUTORAMU KAKUSAN GIJYUTSU NO SUBETE" (Matsuo Kenichi, Tokyo Denki University Press, May 30, 2002, p230-231).

In a SHO state, a mobile station connects simultaneously to a plurality of neighboring base stations using signals of the same frequency. The criterion for a mobile station to switch base stations in a SHO state is based on power of a CPICH (pilot channel) transmitted from each base station. Since all of the base stations send a CPICH at a identical power, reception power of the CPICH at the mobile station can be used as information indicating a distance between the mobile station and the respective base station.

Switching of base stations in a SHO state is carried out on the basis of the reception power of the CPICH. More specifically, switchover processing is performed based on a set referred to as an "active set". The term "active set" refers to a set of base stations for which the CPICH reception power at the mobile station exceeds a predetermined threshold value. The mobile station communicates with base stations that are in the active set.

The reception power of a CPICH from a base station to which a mobile station is coming closer increases in accordance with the movement of the mobile station, and then the base station is added to the active set once the CPICH reception power exceeds the predetermined threshold value. The mobile station then also communicates with the base station to which it is approaching, in addition to the base stations to which it has previously connected. On the other hand, the reception power of a CPICH from a base station from which the mobile station is moving away gradually decreases in accordance with the movement of the mobile station, and then the base station is removed from the active set once the CPICH reception power drops below the predetermined threshold value. Thus, the mobile station performs switchover of base stations during a SHO on the basis of the reception power of CPICH.

In the W-CDMA system, transmit power control is performed for uplink and downlink between a mobile station and a base station even in a SHO state.

As the transmit power control for the downlink, the mobile station transmits the same TPC information to a plurality of base stations to which it has connected for communication. The TPC information transmitted by the mobile station is created for the base station that transmits a dedicated channel with SIR that is largest among SIR of dedicated channels transmitted from a plurality of base stations connecting to the mobile station in a SHO state. That is, in a SHO state, the TPC information transmitted from the mobile station is optimized for one particular base station and is not optimized for other base stations. Herein, the term "dedicated channel" refers to a communication channel that is uniquely allocated to a mobile station among communication channels between base stations and the mobile station, and the term "common channel" refers to a communication channel that is commonly allocated to a mobile station among the communication channels between base stations and mobile stations.

However, although there are relative differences in transmission power among the respective base stations, as long as each base station performs transmit power control for the downlink in the same manner based on TPC information received from a mobile station, a power drift to be described later does not occur.

With regard to transmit power control for the uplink, in general, when a mobile station receives at least an instruction to decrease the transmission power in TPC information received from a plurality of base stations to which the mobile station connected for communication, the mobile station decreases the transmission power of an uplink signal to those base stations. Hence, when a mobile station is communicating with a plurality of base stations in a SHO state, a situation can arise in which the mobile station transmits a signal that is of sufficient power to one base station, but sends a signal that is of insufficient power to another base station.

For a base station that receives a signal with insufficient power, the number of errors in reception of the signal may increase. When an error occurs in reading the TPC information transmitted by a mobile station, the downlink transmission power control at the base station malfunctions, resulting in a phenomenon, called power drift, in which the transmission power is not controlled in accordance with the TPC information that the mobile station transmitted to the base station.

When a power drift occurs, the transmission power of a downlink dedicated channel from the base station drifts. During a SHO, when the transmission power of a downlink dedicated channel from a distant base station happens to be received with large reception power at a mobile station as the result of a power drift, the mobile station commences downlink transmit power control with the distant base station.

Further, when the reception error rate of a signal from the mobile station decreased after the start of transmission power control, transmit power control is carried out to maintain the optimal reception power at the mobile station in accordance with the TPC information from the mobile station, whereby the transmission power of a downlink dedicated channel from the distant base station is maintained at a high level.

Accordingly the transmission power of the downlink dedicated channel of a distant base station remains high, providing a decrease in the link capacity of the distant base station.

Furthermore, when the mobile station moves further away from the distant base station, communication between the mobile station and the distant base station will ultimately stopped by an SHO operation to switch base stations due to a reduction of reception power of CPICH from the distant base station.

In this case, although a call is not disconnected when the transmission power of a downlink dedicated channel from the base station nearer to the mobile station is large enough to secure minimum communication quality, when the transmission power of the downlink dedicated channel of the near base station is not large enough, the call might be disconnected.

Prior art relating to transmit power control in an SHO state in the technical field of this invention will now be described. WO 99/37111 discloses technology relating a CDMA system and transmit power control to mobile stations during a soft handover. In the CDMA system, the transmission power of a mobile station is optimally controlled during a soft handover. During a SHO, a mobile station that received TPC information respectively from a plurality of base stations calculates reliability information to implement weighting that is proportional to signal power and inversely proportional to noise power on the basis of reception power (signal power). The reception power is obtained by averaging the TPC information using a predetermined time constant and the average SIR within a recent predetermined time period. The mobile station weighs the TPC information received from each base station using the reliability information, and then performs transmit power control based on the result.

According to the technology disclosed in WO 99/37111, although uplink transmit power control during a SHO is stabilized, downlink transmit power control that takes into account the movement of a mobile station with respect to a base station is not realized. Thus, the problem of the risk of a sudden call disconnection in a SHO state due to a power drift is not solved.

Japanese Patent Application Laid-Open No. 2003-163630 discloses technology relating to transmit power control of an uplink that is performed by a mobile station during a soft handover in a CDMA system. The technology is directed to correcting unsuitable transmit power control of an uplink of a mobile station caused by an error in receiving TPC information transmitted from a plurality of base stations in an SHO state. In contrast to conventional technology in which transmit power control was conducted on the basis of only a hard decision result with respect to TPC information, a mobile station that received TPC information separately from a plurality of base stations during a SHO conducts transmit power control based on the output result of a specific soft-decision algorithm and a hard decision result. For the soft decision, a method that makes a decision based on a specific threshold value, a method that disperses a decision result at a certain probability using a random number or cyclical processing or the like after making a decision based on a specific threshold value and the like are disclosed.

According to the technology disclosed in Japanese Patent Application Laid-Open No. 2003-163630, although uplink transmit power control during a SHO is stabilized, downlink transmit power control that takes into account the movement of a mobile station with respect to a base station is not realized. Thus, the problem of the risk of a sudden call disconnection in a SHO state due to a power drift is not solved.

Japanese Patent Application Laid-Open No. 2003-338786 discloses technology relating to base stations during a soft handover in the CDMA system. The technology is directed to preventing an increase in the amount of processing for transmit power control at a base station, and also directed to stably maintaining a favorable communication state regardless of whether or not a mobile station is in a handover state. SIR of a signal from a mobile station is monitored during a soft handover, and when the SIR is equal to or less than a predetermined threshold value and a possibility of the occurrence of a reception error has arisen, downlink transmit power control based on TPC information that has a low degree of reliability from the mobile station is stopped at once to thus avoid disturbing the communication state. Further, when the SIR from the mobile station exceeds a predetermined threshold value after stopping the transmission power control, transmit power control based on the TPC information is resumed.

According to the technology disclosed in Japanese Patent Application Laid-Open No. 2003-338786, the occurrence of a power drift during a SHO can be prevented. However, downlink transmit power control that takes into account the movement of a mobile station with respect to a base station is not realized. Even for downlink transmit power control based on TPC information having a high degree of reliability, the problem of the risk of a sudden call disconnection during a SHO when the distance to a mobile station is far is not solved.

Japanese Patent No. 10-112683 discloses technology relating to transmit power control during site diversity (soft/softer handover). When sufficient reception quality cannot be maintained for a signal from the mobile station to one base station among a plurality of base stations that a mobile station is connected to simultaneously during site diversity, the error rate of a control signal transmitted to the base station from the mobile station increases, a transmit power control error becomes large and interference increases. This constitutes a cause of capacity degradation in the CMDA system. The invention of Japanese Patent No. 10-112683 is directed to preventing this capacity degradation. The technology is characterized in conducting transmit power control using another separate control signal between a mobile station and a radio access network controller in addition to the normal transmit power control between a mobile station and a base station during site diversity.

According to the technology disclosed in Japanese Patent No. 10-112683, it is possible to perform highly precise transmit power control to reduce the interference amount and increase capacity in a CDMA mobile communication system. However, Japanese Patent No. 10-112683 discloses nothing at all regarding downlink transmit power control that takes into account the movement of a mobile station with respect to a base station. Even for downlink transmit power control based on TPC information having a high degree of reliability, the problem of the risk of a sudden call disconnection during a SHO when a mobile station performs a transmit power control with a base station which is far from the mobile station is not solved.

SUMMARY OF THE INVENTION

A exemplary object of the present invention is to solve the problems described above and provide a communication network in which a mobile station and a plurality of base station may perform a stable soft handover.

An exemplary method according to the present invention comprises detecting movement of a mobile station; and modifying, at a first base station among a plurality of base stations, a transmit power control based on the detection of the movement of the mobile station, the transmit power control comprising controlling transmit power of a wireless signal to the mobile station based on a transmit power control signal which is received from the mobile station, and the transmit power control signal requesting to increase or decrease the transmit power.

Another exemplary method according to the present invention comprises receiving, at a mobile station, downlink dedicated wireless signals from base stations in an active set which are chosen from a plurality of base stations, the downlink dedicated wireless signals being transmitted from the base stations in the active set at dynamically controlled transmit power; receiving, at the mobile station, pilot wireless signals from the plurality of base stations, the pilot wireless signals being transmitted from the plurality of base station at fixed transmit power; detecting movement of the mobile station; modifying first reception power at the mobile station of a first pilot signal transmitted from a first base station among the plurality of base stations based on the detection of the movement; and choosing the base stations in the active set from the plurality of base stations based on the modified first reception power.

A further exemplary method according to the present invention comprises detecting movement of a mobile station; and modifying a value of a first reception quality at the mobile station of a wireless signal transmitted from a first base station among a plurality of base stations based on the detection of the movement.

BRIEF DESCRIPTION OF THE DRAWINGS

These and other features, aspects, and advantages of the present invention will become better understood with reference to the following description and accompanying drawings, which should not be read to limit the invention in any way, in which.

DETAILED DESCRIPTION OF THE INVENTION

Figure 1:
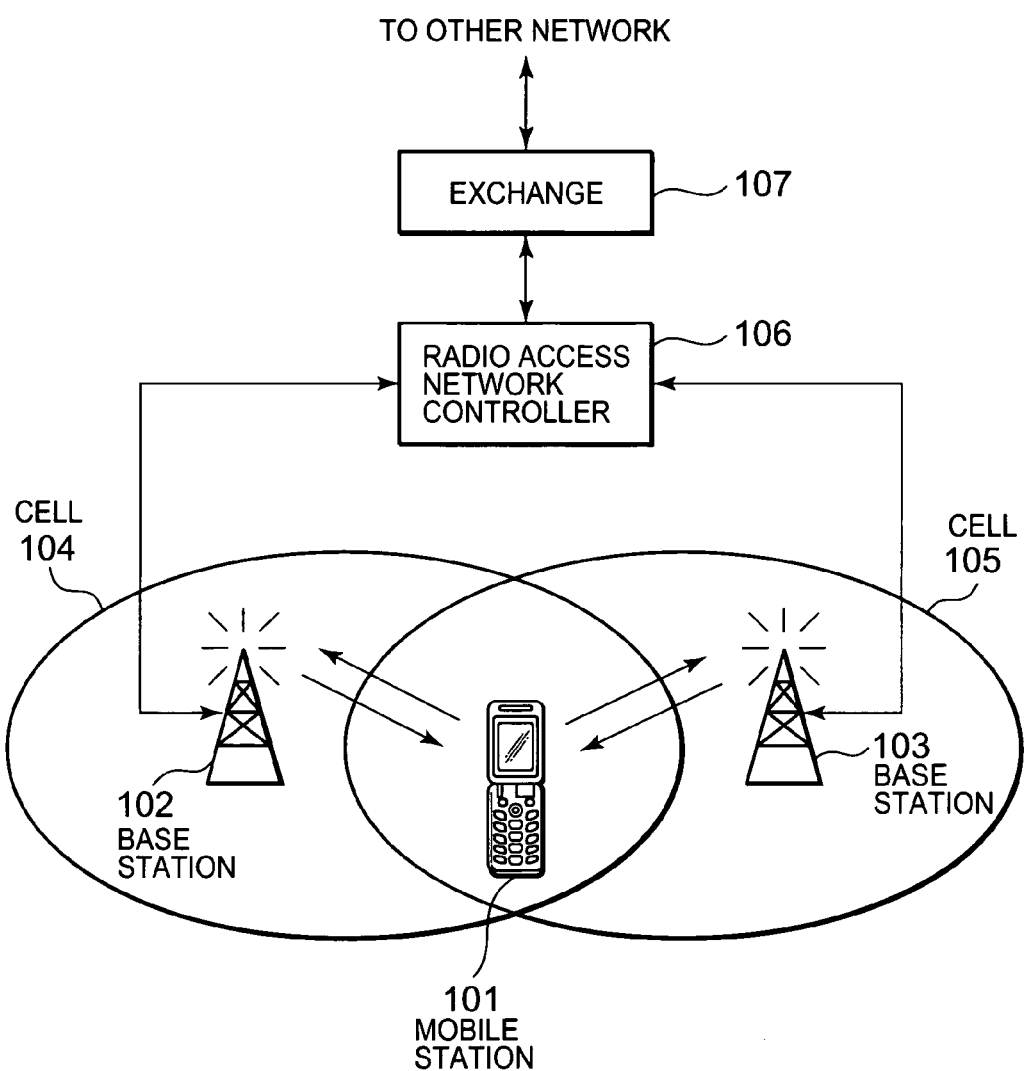
FIG. 1 shows a general view of a system according to a first embodiment of the present invention.

Exemplary embodiments of the invention are described below with reference to the attached figures. The described exemplary embodiments are intended to assist in the understanding of the invention and are not intended to limit the scope of the invention in any way.

According to an exemplary embodiment of the present invention, a communication network comprises a mobile station and a plurality of base stations. The mobile station transmits and receives wireless signals to and from the plurality of base stations.

A base station that is one of the plurality of base stations detects movement of the mobile station. For example, the base station may detect whether the mobile station approaches the base station. Furthermore, the base station may detect the movement of the mobile station based on at least reception timing of a wireless signal from the mobile station, distances from the mobile station to the respective base station, positional information of the mobile station obtained by using a satellite based positioning system, reception power at the mobile station of a pilot signal transmitted by the first base station at fixed transmit power or any information, as would understood in the art, that is useful for detecting the movement of the mobile station.

Also, the base station may detect whether reception quality at the mobile station of a wireless signal transmitted from the base station is the highest value among reception qualities of wireless signals from a plurality of base stations. For example, the base station may perform the detection regarding the reception quality based on at least a notification, which is transmitted from the mobile station, that the first reception quality is the best among the reception qualities, information regarding the first reception quality transmitted from the mobile station, whether the mobile station controls transmit power of a wireless signal transmitted to the first base station based on transmit power control signal transmitted to the mobile station from the first base station or any other information, as understood in the art, that is useful for performing the detection regarding the reception quality.

The base station performs a downlink transmit power control wherein the transmit power of wireless signals to the mobile station is controlled based on a transmit power control signal received from the mobile station. The transmit power control signal instructs to increase or decrease of the transmit power.

Furthermore, the base station may modify the downlink transmit power control based on at least the detection of the movement of the mobile station and the detection regarding the reception quality. For example, the base station may modify the downlink transmit power control by at least varying a control step for the downlink transmit power control, increasing the transmit power if the base station receives a predetermined number of transmit power control signals requesting to increase the transmit power in a row or decreasing the transmit power if the base station receives a second predetermined number of transmit power control signals requesting to increase the transmit power in a row. Here, the predetermined number for the transmit power control signal requesting to decrease the transmit power may be equal to or more than the predetermined number for the transmit power control signal requesting to increase the transmit power. The base station may modify the downlink transmit power if the mobile station approaches the base station. Furthermore, the mobile station may modify the downlink transmit power if the reception quality at the mobile station of a wireless signal transmitted from the base station is the best among reception qualities of wireless signals from a plurality of base stations Accordingly, the mobile station and the plurality of base stations may perform a stable soft handover.

According to another embodiment of the present invention, the mobile station receives downlink dedicated wireless signals from base stations in an active set. The base stations in the active set belongs to the plurality of base stations. The dedicated wireless signals are transmitted from the base stations in an active set at dynamically controlled transmit power. Furthermore, the mobile station receives pilot wireless signals from the plurality of base station. The pilot wireless signals are transmitted from the plurality of base station at fixed transmit power.

The mobile station detects its movement. Further, the mobile station detects whether reception quality at the mobile station of a dedicated wireless signal from a base station of the plurality of base stations is the best among reception quality of dedicated wireless signals from the plurality base stations. The mobile station may perform the detection of the movement and the detection regarding the reception quality in a manner similar to that described above with respect to the detections at a base station.

Furthermore, the mobile station modifies reception power of the pilot wireless signal based on at least the detection of the movement or the detection regarding the reception quality. For example, the mobile station may modify the reception power by at least adding a predetermined value to the reception power, subtracting a predetermined value from the reception power or multiplying the reception power by a predetermined value.

In addition, the mobile station chooses the base stations in the active set from the plurality of base stations based on the modified reception power.

Accordingly, the mobile station and the plurality of base station may perform a stable soft handover.

According to a further exemplary embodiment of the present invention, the mobile station performs the detection of the movement of the mobile station and the detection of the reception quality. Furthermore, the mobile station modifies a value of the reception quality based on at least the detection of the movement or the detection regarding the reception quality and then uses the value of the first reception quality or the decision regarding the reception quality itself.

Accordingly, the mobile station and the plurality of base station may perform a stable soft handover.

Exemplary embodiments according to the present invention will be described in detail below.

FIG. 1 shows is a general view of a system according to a first embodiment of the invention.

A mobile station 101 is a wireless communication terminal such as a mobile phone, and base stations 102 and 103 are radio base stations. Cells 104 and 105 are radio areas that are covered by the base stations 102 and 103, respectively. In FIG. 1, the mobile station 101 is located in an area in which the cells 104 and 105 overlap.

A radio access network controller 106, which may be called a base station control apparatus, is an apparatus that controls the base stations 103 and 104, and it is connected to the base stations 103 and 104 for communication. The radio access network controller 106 controls the base stations 102 and 103 to handle an access by the mobile station 101, a handover or the like.

An exchange 107 is an apparatus that performs line switching. The exchange 107 is connected to the radio access network controller 106 and is also connected to another network.

An operation of the system of FIG. 1 will now be described.

In FIG. 1, it is assumed that the mobile station 101 is in an SHO state. That is, the mobile station 101 is connected to both the base station 102 and the base station 103.

Communication data including voice data and non-voice data is transmitted from the mobile station 101 to the other network through the base stations 102 and 103, the radio access network controller 106 and the exchange 107, and ultimately is transmitted to the remote communication station. Conversely, communication data transmitted from the remote communication station is transmitted to the mobile station 101 through a route that is the reverse of the above described route.

Figure 2:
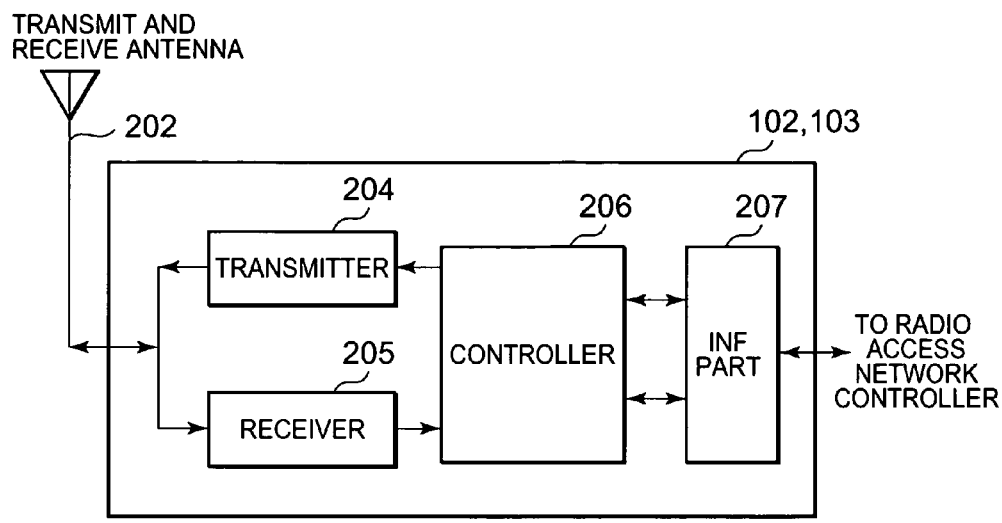
FIG. 2 shows a functional block diagram of a base station according to the first embodiment.

FIG. 2 illustrates principal functional blocks of a base station according to the first exemplary embodiment. The base station 102, 103 of FIG. 2 corresponds to the base stations 102 and 103 of FIG. 1. The base station 102 (103) comprises a transmit and receive antenna 202, a transmitter 204, a receiver 205, controller 206 and INF part 207.

The transmit and receive antenna 202 is an antenna that transmits and receives radio signals, and is used for wireless communication with the mobile station 101.

The transmitter 204 amplifies an RF signal of communication data to be transmitted to the mobile station 101. The amplification degree is controlled by a control signal from a controller 206, based on TPC information received from a mobile station. Further, the receiver 205 amplifies an RF signal of communication data received from the mobile station 101. The transmitter 204 and receiver 205 are connected to the controller 206 and the antenna 202.

The controller 206 comprises electronic circuits such as a circuit that processes communication signals and a control circuit that controls peripheral circuits within the base station 102 (103) and/or other circuit as would understood in the art. The controller 206 carries out control of the circuits within the base station 102 (103), communication between a mobile station and a radio access network controller, control therefor and the like. For example, the controller 206 performs spreading and despreading signals, chip synchronization, rake synthesis, error correction coding and decoding, processing of uplink and downlink TPC information and the like. Further, the controller 206 also performs operation control relating to the first embodiment as described later.

An INF part 207 comprises a circuit having an interface function for communication with the radio access network controller 106.

An operations of the base station 102 (103) will now be described referring to FIG. 2. Communication data including voice data or non-voice data received from the radio access network controller is input to the controller 206 through the INF part 207.

At the controller 206 processes the communication data from the radio access network controller with a protocol terminated between the radio access network controller 166. Furthermore, the controller 206 processes the communication data from the radio access network controller with a protocol that is suitable for communication with the mobile station. More specifically, the controller 203 may perform error-correction coding, signal spreading, attachment of TPC information for uplink transmit power control and the like. Further, in the course of processing the communication data, the controller performs processing of various information according to the exemplary embodiment, to be described later, and processing of information of control data included in the communication data.

The controller 206 transfers the communication data to the transmitter 204. The transmitter 204 performs an amplification processing to the communication data. The amplification processing is carried out based on TPC information for downlink transmit power control information transmitted from the mobile station and received through the receiver 205. Thereafter, the transmitter 204 transmits the communication data as radio signals through the transmit and receive antenna 202.

In contrast, the receiver 205 receives a radio signal from the mobile station 101 trough the transmit and receive antenna 202. The receiver 205 performs an amplification processing to the received signal and transfer the received signal to the controller 206. The controller 206 processes the communication data in the signal from the receiver 205 with a protocol terminated between the base station 102 (103) and the mobile station 101. Furthermore, the controller processes the communication data with a protocol suitable for the radio access network controller. More specifically, the base controller 206 performs spreading the signal, error-correction decoding the communication data in the signal, extraction of TPC information from the communication data, calculation of TPC information for uplink transmit ower control based on the reception power of the received signal and the like are performed. Thereafter, the controller transfers the communication data to the radio access network controller through the INF part 207. Further, the controller 206 performs various kinds of information processing according to the exemplary embodiment to be described later.

Figure 3:
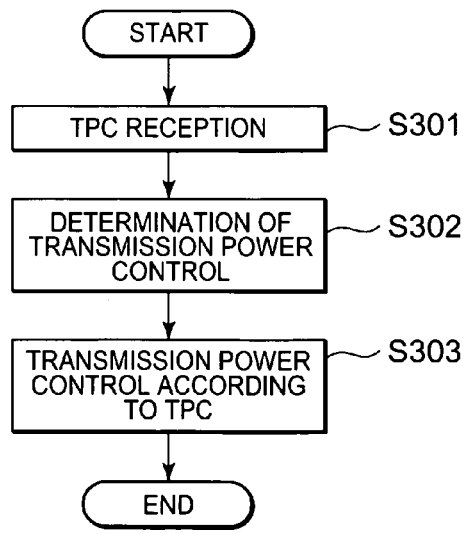
FIG. 3 shows a flowchart of transmit power control according to the first embodiment.

FIG. 3 is a flowchart showing a flow of transmit power control in the first exemplary embodiment of this invention. The controller 206 performs a main information processing relating to transmit power control.

The base station 102 (103) receives TPC information from the mobile station 101 (S301). More specifically, the controller 206 in the base station 102 (103) extracts TPC information from communication data received from the mobile station. Thereafter, the controller 206 performs processing of various information in a transmit power control determining step (S302), and then performs transmit power control for a downlink radio signal (S303).

In S302, the TPC information that was extracted in S301 is not used as it is but is incorporated with other information such as movement of the mobile station and an existence or a non-existence of a best path (e.g., information about which base station provides the best path for the mobile station 101). A detailed description of S302 is provided later.

Herein, the term "best path" refers to a communication between a mobile station and a base station in that communication state or a quality of a dedicated channel between the base station in question and the mobile station being favorable in comparison with communication between the mobile station and other base stations. That is, quality of communication between a mobile station and a base station which provides the "best path" is the highest value among those of communication between the mobile station and base stations to which the mobile station can connect.

Figure 4:
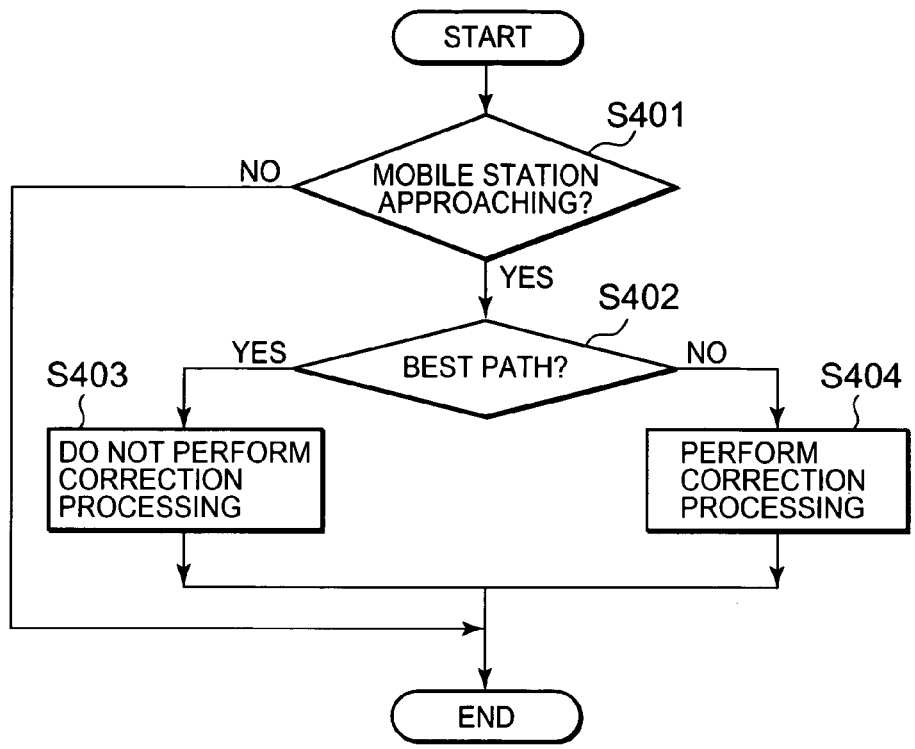
FIG. 4 shows a flowchart of transmit power control according to the first embodiment.

FIG. 4 is a flowchart showing a detailed description of the processing of the transmit power control determination (S302) of FIG. 3. In FIG. 4, processing is carried out to perform transmit power control that also takes into account information regarding a distance (mobile station movement state) between a mobile station and a base station and whether the base station provides the best path that have not been taken into account in the conventional transmission power control. That is, the base station 102(103) modifies transmission power control based on movement state of a mobile station and whether a base station provide the best path.

First, the flow of the processing of FIG. 4 will be described overall. A base station 102 (103) determines whether or not a mobile station is approaching the base station 102 (103) (S401). When a mobile station 101 is not approaching or when a mobile station is approaching and communication between the base station 102 (103) and the mobile station 101 is the best path (YES in S402), the base station 102 (103) does not perform correction processing (S403). That is, the base station 102 (103) performs regular transmit power control. In contrast, when a mobile station 101 is approaching the base station 102 (103) and communication between the base station 102 (103) and the mobile station 101 is not the best path (NO in S402), the base station performs correction processing (S404).

A detailed description of the correction processing (S404) is provided later.

When it is assumed that an approach of a mobile station to the base station will continue further and communication between the base station in question and the mobile station is not the best path, there is a high possibility that the base station in question will become nearer in distance to the mobile station than a base station that currently provides the best path for the mobile station, and the base station in question will provide the best path for the mobile station.

Hence, where a mobile station is approaching a base station and the base station in question does not provide the best path for the mobile station, an effect of the exemplary embodiment is achieved by actively increasing downlink transmission power of the base station that the mobile station is approaching so that the base station in question provide the best path for the mobile station soon.

Next, each of the processing operations of FIG. 4 will be described in detail. The base station 102 (103) determines whether or not the mobile station 101 is approaching the base station 102 (103) (S401). Here, the base station 102 (103) determines the movement state of the mobile station 101 with respect to the base station 102 (103), such as whether or not the mobile station 101 is approaching or moving 102 (103). More specifically, the base station 102 (103) may determine the movement state by means of a method utilizing a signal delay, a method utilizing information regarding relative distances from a plurality of base stations to the mobile station 101, a method utilizing the GPS (Global Positioning System), a method in which the base station 102 (103) receives a notification regarding reception power of a CPICH from the mobile station 101 or any other method for obtaining information about the movement state as would understood in the art. Each of these methods will now be described in detail.

First, a method utilizing a signal delay is described. In general, in a W-CDMA system base stations are asynchronous with each other and it is necessary for a base station and a mobile station to establish synchronization prior to communication. A base station synchronizing with a plurality of mobile stations recognizes the synchronization timing of each mobile station based on their deviation (delay amount) with respect to its own unique timing.

A method using a signal delay is a method in which a base station 102 (103) detects the movement state of a mobile station 101 based on a change in the delay amount of a radio signal transmitted to the base station 102 (103) from a mobile station 101 with respect to the base station 102 (103)'s unique timing (i.e., a change in reception timing of a radio signal). More specifically, if at a certain time (t0) a delay amount of a signal from a mobile station is a delay amount of $\Delta T0$ with respect to the synchronization timing of the base station, and at a different time (t1) thereafter the delay amount becomes a delay amount of $\Delta T1$ with respect to the synchronization timing of the base station, when $\Delta T0<\Delta T1$, since the delay amount has increased it indicates that the mobile station is moving away from the base station. In contrast, when $\Delta T0>\Delta T1$, since the delay amount has decreased it indicates that the mobile station is approaching the base station In this way, the base station detects the movement state of the mobile station using the signal delay.

Next, a method utilizing information regarding relative distances from a plurality of base stations will be described. A method utilizing information regarding relative distances from a plurality of base stations is a method that uses signal delay amounts between a mobile station and a plurality of base stations to calculate information regarding the relative distances between the mobile station in question and the respective base stations, and then calculates positional information of the mobile station in question by combining that information regarding the relative distances with positional information of the plurality of base stations that is already known. This method is typically represented by an OTDOA (Observed Time Difference Of Arrival) method. The term "OTDOA" refers to a method in which hyperbolic curves taking each of a plurality of base stations as a focus are defined based on relative delay differences in reference signals from the plurality of base stations, and the position of a mobile station is determined from a point of intersection of the respective hyperbolic curves. At least 3 base stations are required to calculate the point of intersection of the hyperbolic curves.

A method utilizing information regarding the relative distances from a plurality of base stations is, as described in the foregoing, a method for detecting the movement state of a mobile station on the basis of calculated positional information of the mobile station and variations over time in the positional information.

Next, a method utilizing the GPS will be described. The term "GPS" refers to a positioning system based on a plurality of satellites whereby an object calculates its own position using signal transmitted from the plurality of satellites.

A method using the GPS is a method in which a base station detects a movement state of a mobile station 101 by using positional information of a mobile station 101 obtained by the GPS and variations in the positional information. More specifically, in the method, a mobile station 101 periodically may determine its own positional information using the GPS and may notify a base station 102 (103) of the result. In this case, the GPS may be used directly or indirectly to determine the position. Further, in response to a request from a base station or at an irregular timing based on a specific random number, the mobile station 101 may determine its own positional information using the GPS and notify the result to the base station 102 (103).

In this manner, the base station 102 (103) detects the movement state of a mobile station 101 utilizing the GPS.

Next, a method in which a base station receives a notification regarding reception power of a CPICH from a mobile station will be described. The term "CPICH" refers to a pilot channel or signal that is transmitted at fixed power by each base station in a W-CDMA system. A mobile station detects a distance between it and each base station on the basis of the reception power of the CPICH from each base station. Accordingly, the base station 102 (103) receives a notification regarding information about a distance between the mobile station 101 and the base station 102 (103) from the mobile station 101 by receiving the information regarding the reception power of the CPICH.

Thus, the base station 102 (103) detects the movement state of the mobile station 101 on the basis of notified distance information and variations in the information.

Next, processing that is performed by the mobile station 101 accompanying the above described processing to detect the movement state of the mobile station 101 will be described. Since a mobile station 101 does not perform additional processing for a method utilizing a signal delay, herein a description is provided for a method utilizing information regarding relative distances from a plurality of base stations, a method utilizing GPS, and a method in which the relevant base station receives a notification regarding reception power of a CPICH from a mobile station.

Figure 5:
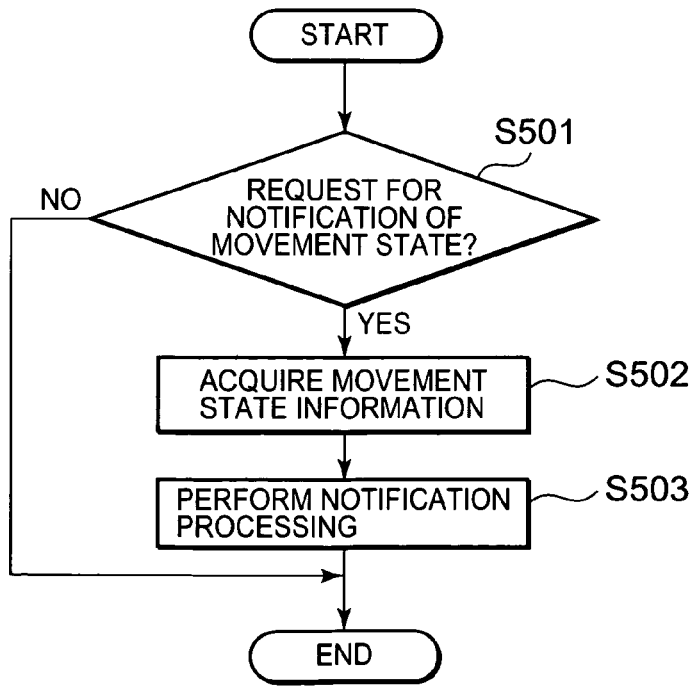
FIG. 5 shows a flowchart of a control of a mobile station according to the first embodiment.

FIG. 5 is a flowchart showing the processing of a mobile station. In general, a mobile station carries out various normal control processing such as transmission power control, position registration, monitoring of a paging channel (monitoring of the existence or non-existence of a call), handover and the like. In addition to the normal control processing, the mobile station 101 carries out the processing of FIG. 5, and repeats the processing from the start to the end of FIG. 5. Although cycle of the repetition may be identical with one cycle of the transmission power control, it may also be a constant multiplication of the transmit power control cycle.

The mobile station 101 determines whether or not a request for notification of its movement state was received from a base station 102 (103) (S501). When the request for notification of its movement state was not received (NO in S501), the mobile station ends the relevant processing.

In contrast, when the request for notification of its movement state was received (YES in S501), the mobile station 101 acquires information relating to its movement state (S502). Here, in the case of a method utilizing information regarding relative distances between a plurality of base stations and the mobile station 101, the mobile station 101 performs a predetermined operation based on signal delay information from a plurality of base stations and the positional information of the base stations that is already known. As a result of the operation, the mobile station acquires information relating to its movement state and notifies the information to the base station 102 (103) (S503).

If it takes a while to perform the processing based on information regarding relative distances between a plurality of base stations 102 (103) and the mobile station 101, the processing may be performed prior to receiving the request for notification of its movement state from the base station 102 (103). Further, the processing may be broken up into processing to be performed in each processing of FIG. 5, and a whole processing relating to movement state information may be carried out once while performing the processing of FIG. 5 plural times.

In a case of the method that utilizes the GPS (Global Positioning System), the movement state of a mobile station 101 is determined using the GPS (S502). Here, since a description has already been given with respect to a variation in a movement state using the GPS, a further description is omitted here. Information relating to a movement state that was obtained by processing is notified to the base station (S503).

Further, in a case of the method in which a base station 102 (103) receives a notification regarding reception power of a CPICH from a mobile station 101, the mobile station 101 extracts information regarding the reception power of a CPICH received from the base station 102 (103), which requested a notification of the movement state of the mobile station, from information regarding reception power of CPICHs from a plurality of base stations. Normally, information regarding the reception power of a CPICH from each base station is managed by a separate routine that controls an SHO. In the processing of FIG. 5, the reception power of a CPICH that was determined by a separate routine is acquired in S502. Thereafter, the mobile station 101 notifies the base station 102 (103) of the information regarding the reception power of the CPICH transmitted from the base station 102 (103) (S503).

The mobile station 101 may obtain the information regarding the reception power of a CPICH in the processing of S502 instead of extracting it from the information managed by the separate routine. Although a description has been given for a configuration in which the base station 102 (103) transmits a request for notification of a movement state, the configuration may be employed in which the base station 102 (103) does not transmit a request for notification of the movement state of the mobile station, and the mobile station 101 periodically performs processing to notify its movement state to base stations 102 (103).

Referring back to FIG. 4, when it is determined by the processing of S401 that the mobile station 101 is not approaching the base station 102 (103), the processing of FIG. 4 is ended and the base station 102 (103) performs transmit power control on the basis of TPC information that was extracted from the communication data and is not corrected (FIG. 3, S303).

In contrast, when it is determined by the processing of S401 that a mobile station 101 is approaching the base station 102 (103), it is then determined whether or not the communication between the base station 102 (103) and the mobile station 101 is the best path (S402).

The base station 102 (103) may detect whether the communication between the base station 102 (103) and the mobile station 101 is the best path by using a method in which the base station 102 (103) receives a notification regarding an existence or a non-existence of the best path from the mobile station 101 (e.g., a notification of which base station provides the best path for the mobile station 101), a method in which the base station 102 (103) receives from the mobile station 101 a notification of the SIR value of a dedicated channel in a reception signal from the base station 102 (103), and a method based on tracking of the transmit power control or any other method, as would be understood in the art, for detecting whether the communication between the base station 102 (103) and the mobile station 101 is the best path. Each method is described in detail hereunder.

First, a method in which the base station 102 (103) receives a notification regarding an existence or a non-existence of the best path from a mobile station 101 (e.g., a notification of which base station provides the best path for the mobile station 101) is described.

In the method, the mobile station 101 transmits a dedicated channel including a notification regarding the existence or non-existence of the best path to a base station 102 (103). More specifically, transmits communication data of the dedicated channel may channel include an identification number of the base station 102 (103) and information such as which base station provides the best path for the mobile station 101.

Next, a method in which the base station 102 (103) receives from the mobile station 101 a notification of an SIR value of a reception signal from the base station 102 (103) is described. The mobile station 101 transmit communication data including the SIR value of a signal received from the base station 102 (103) to the base station 102 (103). More specifically, the communication data may include an identification number of the base station 102 (103) and the information regarding the SIR value such as the SIR value itself, a representative value thereof, a mean value thereof or any other information regarding the SIR as would understood in the art.

Next, a method in which a determination as to whether or not the base station 102 (103) provides the best path for the mobile station 101 is made based on tracking of the transmit power control is described. In the method, the base station 102 (103) determines whether or not a base station provides the best path for the mobile station 101 based on whether the mobile station 101 performs an uplink transmit power control according to TPC information for uplink transmit power control transmitted by a base station 102 (103).

Transmit power control for an uplink signal to the base station 102 (103) from the mobile station 101 is carried out on the basis of TPC information transmitted to the mobile station 101 from the base station 102 (103). In general, when the mobile station 101 receives TPC information from a plurality of base stations, it performs transmit power control only in accordance with the TPC information from a base station that was determined to provide the best path. Taking this fact as a premise, when a mobile station 101 carries out the uplink transmit power that is not in accordance with the TPC information transmitted from the base station 102 (103) to the mobile station 101, the base station 102 (103) may determine that the base station 101 does not provide the best path for the mobile station 101.

More specifically, the base station 102 (103) may store pieces of the TPC information that it transmitted for a predetermined time, compare the information with changes over a predetermined time in uplink transmission power via a change in reception power at the base station 102 (103) of signals transmitted from the mobile station 101, and determine whether or not the mobile station 101 is performing transmit power control for the uplink transmission signal in accordance with the TPC information that the base station 102 (103) transmitted. Further, base station may make the determination describe above based on an instantaneous value of the reception power, a representative value extracted from a predetermined algorithm of the reception power or any other type of value, as would be understood in the art, in order to make the decision. Further, the determination may be performed using a previously established determination value.

Next, processing conducted by the mobile station 101 accompanying processing by the base station 102 (103) to determine whether or not the base station provides the best path is described.

Since the method that determines whether or not the base station 102 (103) provides the best path by tracking the transmit power control is not accompanied by operations by the mobile station 101, the method in which the base station 102 (103) receives a notification of an existence or a non-existence of the best path from the mobile station 101 (e.g., a notification of which base station provides the best path for the mobile station 101) and the method in which the base station 102 (103) receives from the mobile station 101 a notification of the SIR value of a reception signal of a dedicated channel from the base station 102 (103) are described.

Figure 6:
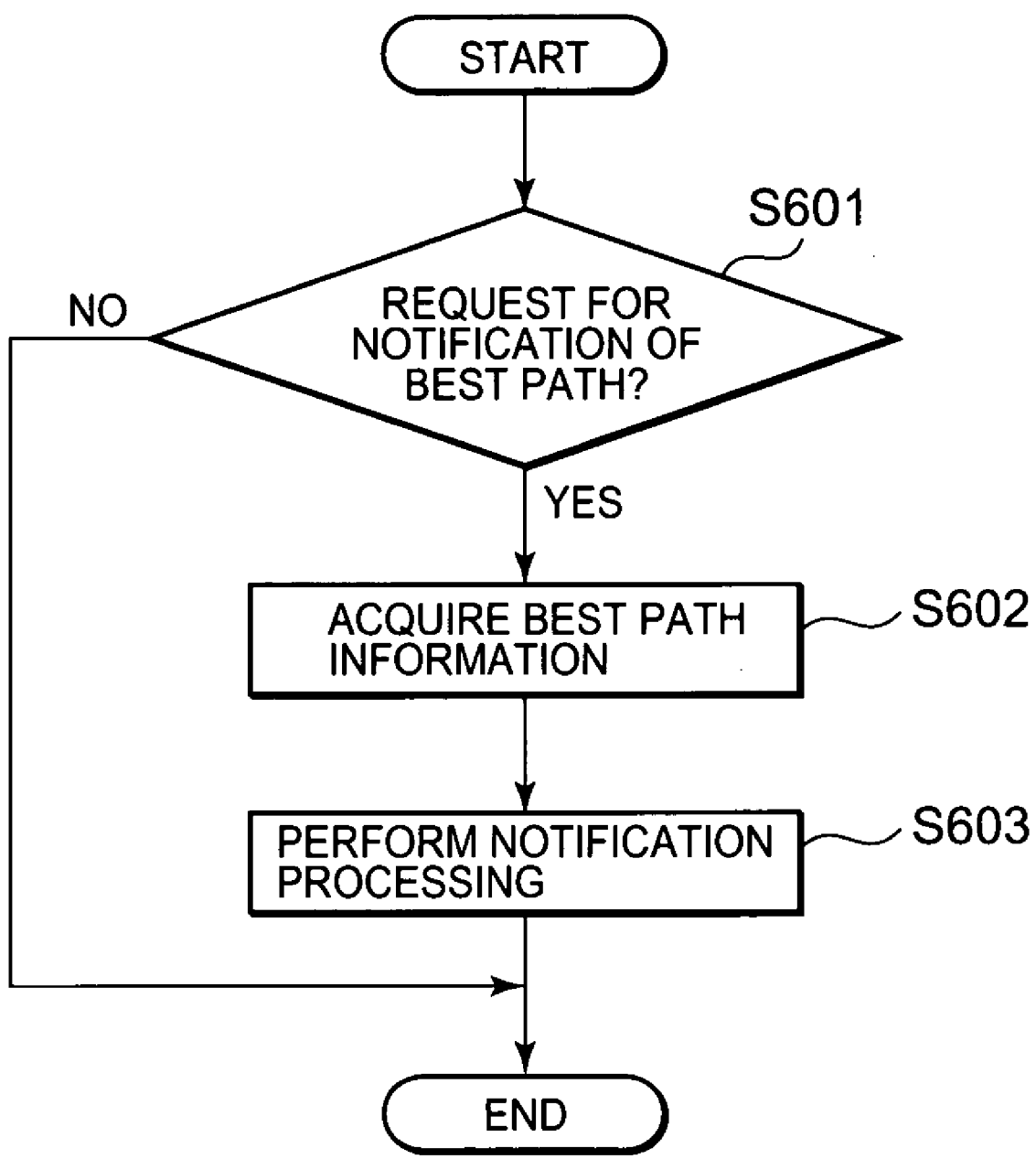
FIG. 6 is a flowchart of a control of a mobile station according to the first embodiment of this invention.

FIG. 6 is a flowchart showing the processing of the mobile station 101. The mobile station 102 (103) periodically performs the processing of FIG. 6 in addition to normal control operations such as transmission power control.

The mobile station 101 determines whether or not a request for a best path notification was received from a base station 102 (103) (S601). When no request for a best path notification was received (NO in S601), the processing in question ends.

In contrast, when the request for the best path notification was received (YES in S601), the mobile station 101 acquires information relating to the best path (S602). Here, in a case of the method in which the base station 102 (103) receives a notification of an existence or a non-existence of the best path from the mobile station 101 (e.g., a notification of which base station provides the best path for the mobile station 101), the mobile station 101 acquires information relating to a base station that is a subject of downlink transmit power control and is managed by a downlink transmit power control routine. As a result thereof, the mobile station 101 determines whether or not the base station 102 (103) that requested the best path notification provides the best path (S602). The mobile station 101 then transmits the notification of the result to the base station 102 (103) (S603).

In a case of the method in which the base station 102 (103) receives from the mobile station 101 a notification of the SIR value of a reception signal of a dedicated channel from the base station 102 (103), the mobile station 101 acquires the SIR values of reception signals of a dedicated channel from base stations including the base station 102 (103) (S602) and sends the relevant result to the respective base stations including base station 102 (103) (S603).

Here, although a description has been given for a configuration in which a request for a best path notification is made by the base station 102 (103), a configuration may be employed in which a request for a best path notification is not made by a base station, and the mobile station periodically performs processing to notify the best path to the base station 102 (103).

When it was determined that a base station provides the best path in the processing of S402 of FIG. 4, information processing (correction processing) is not carried out on the basis of the received TPC information (S403). Hence, normal transmit power control is performed (S303).

In contrast, when it was determined that a base station does not provide the best path in the processing of S402, information processing (correction processing) is carried out on the basis of the received TPC information (S404).

The correction processing (S404) will now be described in detail. For the correction processing, which modifies the transmit power control, a method that raise a control step in the transmit power control according to received TPC information and a method filters the TPC information and the like are available. Transmit power control is carried out based on the result of processing according to each method.

Assume that a regular control step of an increase or a decrease in transmit power in the regular transmit power control based on TPC information is ±1 dB, in that the transmit power is changed by +1 dB for an instruction to increase transmit power and the power is changed by −1 dB for an instruction to decrease transmit power. In the method that raises the control step, for example, the transmit power is increased by +1.5 dB for the instruction to increase transmit power and the transmit power is decreased by −0.5 dB for an instruction to decrease transmit power. The width for raising the control step is not necessarily limited to 0.5 dB, and it may be any value such as 1.0 dB or 0.1 dB.

TPC information which is periodically extracted from the transmission data is subjected to filtering, and results which are output from the filtering are used for the transmit power control. For example, when TPC information instructing the increase (or decrease) of the transmit power is received a predetermined number of times in a row, the base station 102 (103) processes those successive pieces of TPC information into TPC information instructing to increase (or decrease) transmit power which corresponds to the TPC information for a single time. Accordingly, the base station 102 (103) performs the transmit power control according to the processed TPC information. On the other hand, when the same kind of TPC information was not received a predetermined number of times in a row, the base station 102 (103) determines that there was no instruction to increase or decrease the transmission power. This operation corresponds to a low-pass filter. Here, by setting the predetermined number of times for processing the TPC information instructing to decrease transmit power may be greater than the predetermined number of times for processing the TPC information instructing to increase transmit power, so that the downlink transmission power of a base station tends to increase because of the filtering.

In addition to this example, any other types of digital filtering as would be understood in the art are available as filtering.

With an exemplary method for filtering, when a base station 102 (103) received the same kind (increase or decrease) of TPC information a predetermined number of times, whereas normally a variation amount of only ±1 dB is performed, transmit power control is changed by amount of ±2 dB. According to the exemplary method, the transmit power may settle in to a stable transmit power sooner. This corresponds to a high-pass filter.

In this case also, the filter should be employed so that a filtering output is offset to perform correction that tends to increase the downlink transmission power of the base station 102 (103). For example, the output may be offset so that although correction processing of +2 dB is performed, correction processing of -2 dB is not performed and correction processing of -1 dB is performed as usual.

Further, a filtering can also be employed that makes the absolute value of the control step large when TPC information of the same kind was received a predetermined number of times and in other cases makes the absolute value of the control step small.

Various other types of filtering as would understood in the art can also be employed in the exemplary embodiment such as a filter that according to an optimal transfer function on the basis of a result obtained by an actual measurement. However, a filter should be employed so that the downlink transmission power of the base station 102 (103) tends to increase.

Embodiment 2

The second exemplary embodiment of the present invention is now described. In order to avoid redundant description, a description of parts that are same as those in the first exemplary embodiment of the present invention is omitted and a description is provided of only those parts that are different to the first exemplary embodiment.

Figure 7:
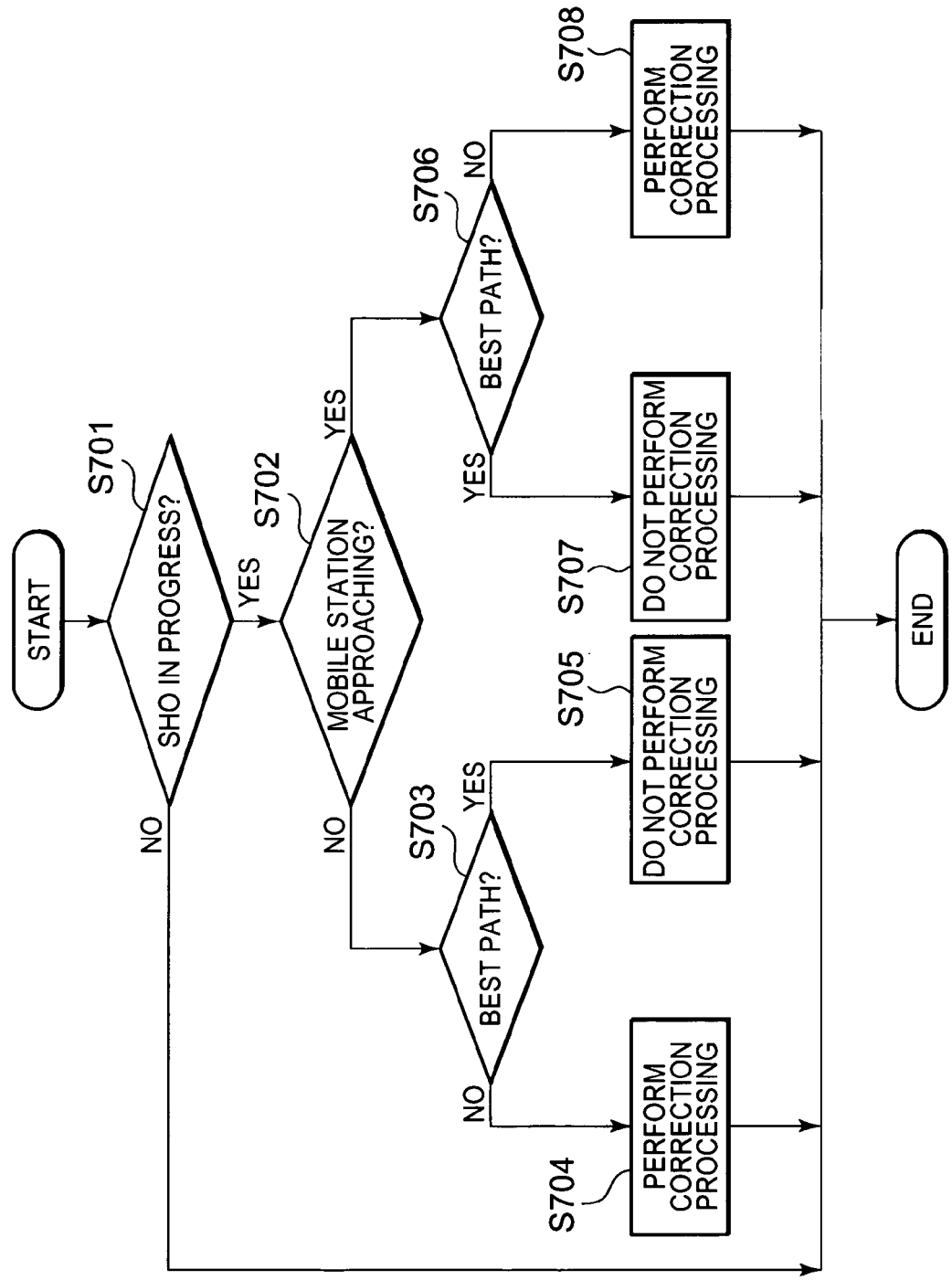
FIG. 7 shows a flowchart of transmit power control according to a second embodiment.

A difference between the first exemplary embodiment and the second exemplary embodiment is contents of the processing corresponding to S302 of FIG. 3. FIG. 7 is a flowchart of processing relating to the second exemplary embodiment.

Principle differences between the two exemplary embodiments are an addition of a step (S701) that determines whether or not the mobile station 101 is in a SHO state as well as a correction processing (S704) that is performed when the mobile station 101 is not approaching and the base station 202 does not provide the best path.

By previously adding the step of determining a SHO (S701) state, the processing according to the exemplary embodiment can be terminated when SHO is not performed (NO in S701).

The SHO determining step (S701) will now be described. A base station 102 (103) acquires information regarding whether or not the mobile station 101 is in the process of a SHO from the radio access network controller 106. When the mobile station 101 is not in the process of a SHO (NO in S701) the processing ends and the operation proceeds to S303.

When the mobile station is in the process of a SHO, the base station 102 (103) detects the movement state of the mobile station (S702), determines whether or not the base station 102 (103) itself provide the best path (S703 or S706), and performs correction processing (S704 or S708) or does not perform correction processing (S705 or S707).

Here, the difference with FIG. 4 is that correction processing (S704) is performed when the mobile station 101 is not approaching the base station 102 (103) (NO in S702) and the base station 102 (103) does not provide the best path for the mobile station (NO in S703). The other points are the same as those in FIG. 4, and a description thereof is thus omitted here to avoid redundancy.

The correction processing of S704 has opposite properties to the correction processing of S708 (corresponding to the correction processing of S404 in FIG. 4.). Namely, since the mobile station 101 is not approaching the base station 102 (103) during a SHO and the base station 102 (103) does not provide the best path, the base station 102 (103) should not actively increase transmit power of a downlink signal because there is a high possibility that the base station 102 (103) in question will be replaced by another base station for the SHO.

For the correction processing of S704, similarly to the first exemplary embodiment, a method that decreases a control step of the transmit power control according to received TPC information, a method that performs filtering or the like can be utilized. Each of these methods will now be described.

First, the method that raises the control step of the transmit power control according to received TPC information is described.

Since the operation reaches the state of S704 where the mobile station 101 is not approaching the base station 102 (103) and the base station 102 (103) does not provide the best path, the transmit power should not be actively increased. Accordingly, the base station 102 (103) decreases the control step of the transmit power control according to received TPC information. Assume that, in a regular transmit power control, a regular control step of an increase or a decrease in transmit power based on TPC information is ±1 dB, in that the transmit power is changed by +1 dB for an instruction to increase transmit power and the transmit power is changed by -1 dB for an instruction to decrease transmit power. In the method according to the exemplary embodiment, for example, the transmit power is increased by +0.5 dB for an instruction to increase transmit power and the transmit power is decreased by -1.5 dB for an instruction to decrease transmit power. The width for decreasing the control step is not necessarily limited to 0.5 dB, and it may be another value such as 0.3 dB.

Next, the method that performs filtering is described. In the filtering TPC information that is periodically extracted is subjected to filtering, and output results from the filtering are used for the transmit power control. For example, when TPC information instructing the base station to increase (or decrease) transmit power was received a predetermined number of times in a row, the base station 102 (103) processes those successive pieces of TPC information into TPC information instructing to increase (or decrease) transmit power and corresponding to the TPC information for a single time. Accordingly, the base station 102 (103) performs the transmit power control according to the processed TPC information. On the other hand, when the same kind of TPC information was not received a predetermined number of times in a row, the base station 102 (103) determines that there was no instruction to increase or decrease the transmission power.

This operation corresponds to a low-pass filter. In this case, by setting the predetermined number of times for processing the TPC information instructing to increase transmit power may be greater than the predetermined number of times for processing the TPC information instructing to decrease transmit power, so that the downlink transmission power of a base station tends to decrease because of the filtering.

With another exemplary method for filtering, when a base station 102 (103) receives the same kind (increase or decrease) of TPC information a predetermined number of times, whereas normally a variation amount of only ±1 dB is performed, transmit power control may be changed by amount of ±2 dB. According to the exemplary method, the transmit power may settle in to a stable transmit power sooner. This corresponds to a high-pass filter.

In this case also, the filter should be employed so that a filtering output is offset to perform correction that tends to decrease the downlink transmission power of the base station 102 (103). For example, the output may be offset so that although correction processing of −2 dB is performed, correction processing of +2 dB is not performed and correction processing of +1 dB is performed as usual.

Various other types of filtering as would understood in the art can also be employed in the exemplary embodiment such as a filter that according to an optimal transfer function on the basis of a result obtained by an actual measurement. However, a filter should be employed so that the downlink transmission power of the base station 102 (103) tends to decrease.

In S704, since the transmission power should not be actively increased, the processing may also consist of a low-pass filter for TPC information instructing to increase transmission power and no filter for TPC information instructing to decrease transmission power.

Embodiment 3

A third exemplary embodiment of the present invention is now described. Unlike the two exemplary embodiments described above, the third exemplary embodiment relates to a mobile station.

Similarly to the foregoing two exemplary embodiments, a system that applies this exemplary embodiment is shown in FIG. 1. To avoid redundancy, a description of FIG. 1 is omitted here.

Figure 8:
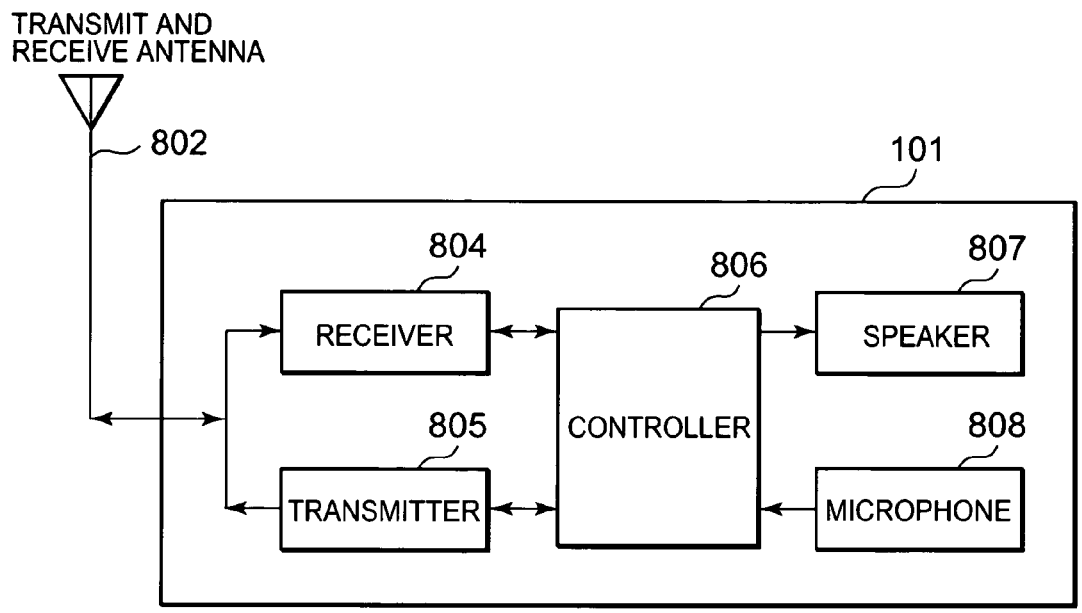
FIG. 8 shows a functional block diagram of a mobile station according to a third embodiment of this invention.

FIG. 8 is a block diagram of principal functions of the mobile station 101 of the third exemplary embodiment of the present invention. A mobile station 101101 of FIG. 8 corresponds to the mobile station 101 of FIG. 1. The mobile station 101 comprises a transmit and receive antenna 802, a receiver 804, a transmitter 805, a controller 806, a speaker 807 and a micro phone 808.

The transmit and receive antenna 802 is an antenna that transmits and receives radio signals from the base station 102 and 103, and it is used for communication with the base stations 102 and 103.

The transmitter 805 amplifies an RF signal of communication data that is transmitted to a base station. The amplification degree is controlled by a control signal from a controller 806 based on TPC information received from a base station 102 (103). Further, a receiver 804 amplifies an RF signal of communication data that is received from a base station 102 (103). The receiver 804 and the transmitter 805 are connected to the controller 806 and the ransmit and receive antenna 802.

The controller 806 comprises electronic circuits such as a circuit that processes communication signals and a control circuit that controls peripheral circuits within the base station 101 and/or any other circuit as would understood in the art.

The controller 806 carries out control of the circuits within the mobile station 101, control of communication with base stations and the like. More specifically, the controller 806 performs spreading and despreading signals, rake synthesis, error correction coding and decoding, processing of uplink and downlink TPC information and the like. Further, the controller 806 also performs operation control relating to the third exemplary embodiment as described later.

The speaker 807 is a circuit that converts an electrical signal that was received from the controller 806 into an audio signal, and the microphone 808 is a circuit that converts an audio signal into an electrical signal.

The operations of the mobile station 101 will now be described referring to FIG. 8. The microphone 808 converts an audio signal to an electrical signal and transfers the converted electrical signal to the controller 806. The controller 806 processes the converted electrical signal with protocols that are suitable for a radio signal, and then transfers the processed signal as communication data to a transmitter 805. More specifically, the controller 806 performs an error correction coding, spreading signal, attachment of TPC information for downlink transmit power control and the like. The transmitter performs an amplification processing to the communication data and transmits the amplified communication data as a radio signal to the base station 102 (103) through the transmit and receive antenna 802.

In contrast, the receiver 804 receives a radio signal from the base station 102 (103) through the transmit and receive antenna 802. After the receiver 804 performs an amplification processing to the received signal, the communication data in the received signal is transferred to the controller 806. The controller 806 processes the communication data with a protocol terminated between the base station 102 (103) and the mobile station 101. Furthermore, the controller 806 extracts voice data or the like from the communication data. More specifically, the controller 806 performs error correction decoding, despreading signals, extraction of TPC information from the communication data transmitted by the base station 102 (103), calculation of TPC information for uplink transmit power control based on reception power of the received signal and the like are performed. Further, the controller 806 extracts control data from the communication data and controls the mobile station 01 by using the control data. TPC information is also included in the control data. The extracted voice data is output as an audio signal through the speaker 807.

A information processing of the third exemplary embodiment of the present invention is mainly carried out by the controller 806. A detailed description of operations of the control processing is provided later.

Figure 9:
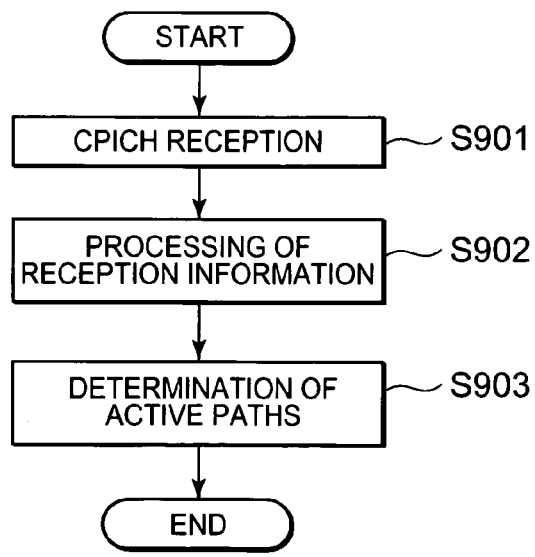
FIG. 9 shows a flowchart illustrating a determination of active paths according to the third embodiment.

FIG. 9 will now be described. FIG. 9 is a flowchart relating to setting of active paths of this exemplary embodiment. Herein, the term "active path" refers to a path between a base station and a mobile station that is in an active set. The term "active set" refers to a set of base stations that are capable of connecting to a mobile station during a SHO.

The reception power of a CPICH from each base station was measured (S901), and active paths were then set based on that information regarding the reception power (S903). In S903, base stations which transmits CPICHs received at the mobile station 101 at reception power exceeding a predetermined threshold value are set as active paths. Furthermore, base stations which transmits CPICHs receive at the mobile station 101 at reception power below a predetermined threshold value are removed from the active paths. A predetermined hysteresis may apply to the threshold value.

According to this exemplary embodiment, a step (S902) of processing the reception power of a CPICH is performed in addition to the process described above. Hereunder, the processing of S902 is described in detail.

Figure 10:
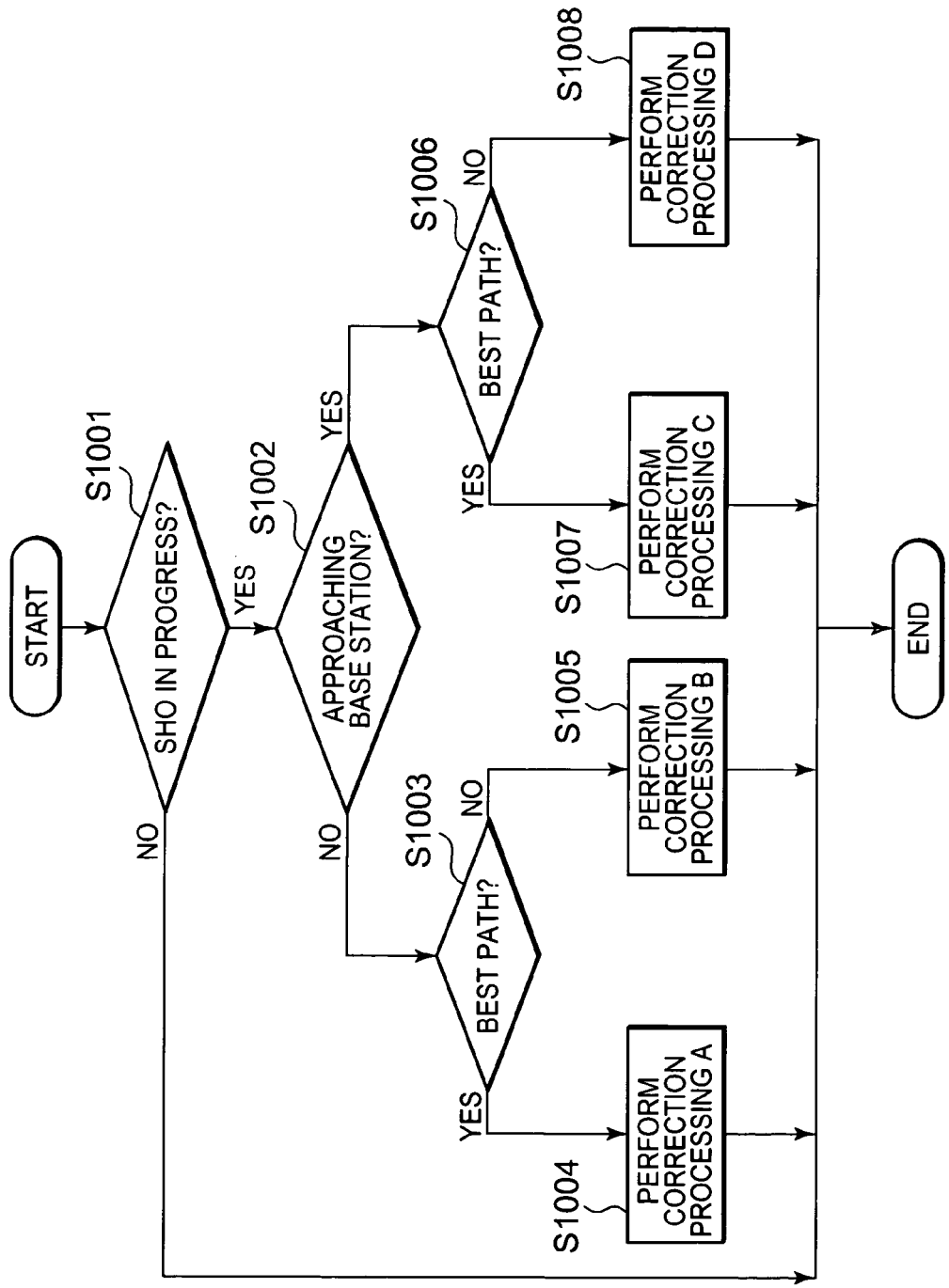
FIG. 10 shows a flowchart of transmission power according to the third embodiment.

FIG. 10 is a flowchart that illustrates the processing of S902 in detail. When the mobile station 101 is connected for communication with a plurality of base stations, more specifically, when a SHO is in progress, the processing of FIG. 10 is conducted for each base station among the plurality of base stations.

First, an overall description of FIG. 10 will be given. Based on the respective results of determining whether the mobile station 101 itself is in the process of a SHO (S1001), whether or not the mobile station 101 is approaching base stations including the base station 102 (103) (S1002) and whether or not the base stations provide the best path for the mobile station 101 (S1003, S1006), the mobile station 101 set different priority levels on the respective base stations, and conducts processing (correction processing A to D) in accordance with the respective priority levels (S1004, S1005, S1007, S1008).

Next, each processing of FIG. 10 is described. First, the mobile station 101 determines whether or not it is in the process of a SHO (S1001). This may be determined based on whether or not CPICHs received at the mobile station 101 at reception power greater or equal to a predetermined threshold value are emitted from a plurality of base stations. Further, determination may be made based on information concerning whether or not a SHO is in progress received from the radio access network controller 106.

When the mobile station is not in the process of a SHO (NO in S1001), it ends the processing of FIG. 10. That is, unless a SHO is in progress the processing of FIG. 10 is not carried out. Hence, setting of an active path is conducted according to a normal algorithm.

In contrast, when the mobile station is in the process of a SHO (YES in S101), the mobile station 101 determines whether or not it is approaching one base station among a plurality of base stations including the base station 102 (103) (S11002). The technology described in the first exemplary embodiment can be utilized to determine whether or not the mobile station 101 is approaching a particular base station. More specifically, it is possible to apply a method that determines if the mobile station 101 is approaching a particular base station by receiving signal delay information, a method that utilizes information regarding relative distances between the mobile station 01 and a plurality of base stations, a method that utilizes the GPS, a method that determines if a mobile station is approaching a particular base station on the basis of reception power of a CPICH from the base station or any other method, as would understood in the art for detecting movement of the mobile station 101.

Regarding each method, in order to avoid a redundant description, parts that same as those in corresponding methods of the embodiments described in the foregoing are omitted here, and only parts that differ to those in the methods described in the foregoing exemplary embodiments are described.

First, the method that determines if the mobile station 101 is approaching a particular base station by receiving signal delay information is described.

The mobile station 101 receives from the base stations signal delay information regarding a signal from the mobile station 101 and uses the delay information as position information. More specifically, the mobile station 01 receives the signal delay information included in communication data from the base stations, so that the mobile station may detects its own movement state based on the received signal delay information and variations in the signal delay information over time.

The method that utilizes information regarding relative distances between the mobile station 101 and a plurality of base stations and a method that utilizes the GPS were described in the foregoing exemplary embodiment, and a description thereof is thus omitted here to avoid redundancy.

Next, the method that determines if a mobile station is approaching a particular base station on the basis of reception power of a CPICH from the base station is described.

A CPICH is transmitted from each base station at a predetermined power, and in general reception power at the mobile station 101 of the CPICH tends to decline in accordance with a distance between the mobile 101 station and the base station. Hence, by measuring the CPICH reception power the mobile station 101 can know the distance between it and the base station in question. Further, a mobile station 101 can also detect its own movement state from the relevant distance information and variations in that information.

More specifically, for example, a mobile station may store for a predetermined time information concerning its position relative to each base station that was calculated from the CPICH reception power, and may detects the distance between it and the base station as well as changes in the distance, i.e. the movement state of the mobile station, by calculating the amount of variation in the positional information.

Next, processing that determines whether or not a base station provides the best path for a mobile station (S1003 and S1006) is described.

In this embodiment, since the object performing the determination is the mobile station 101, unlike the exemplary embodiments described above, the mobile station 101 may determine whether or not a base station provides the best path on the basis of the SIR value of a reception signal from the base station in question. More specifically, for example, the mobile station 01 may store the SIR value of a reception signal from each mobile station for a predetermined time to determine whether or not a base station provides the best path on the basis of whether or not the SIR value of a reception signal from the base station in question is the largest SIR value.

Next, the correction processing from A to D will be described. As described in the foregoing, in the correction processing from A to D the setting of active paths is carried out in accordance with the priority levels of the base stations.

The term "active paths" refers to a set of paths or communication between the mobile station and base stations in an active sat for an SHO. That is, the mobile station 101 communicates or connects with the base station in the active set in the course of the SHO. Hence, it is preferable to actively include a base station with which the mobile station 101 currently performs transmit power control in the active paths. Further, by actively setting the base station in the active paths when the mobile station 103 is approaching the base station, quality of the SHO is enhanced.

Therefore, the mobile station 101 sets a higher priority level on a base station that provides the best path and sets lower priority level on a base station that does not provide the best path. Further, the mobile station 101 sets higher priority level on a base station that the mobile station is approaching and sets lower priority level on a base station from that the mobile station is moving away.

Hence, in setting an active set, the mobile station sets the highest priority level on the correction processing C (S1007), and sets lower priority levels on other correction processing in the order of correction processing A (S1004), correction processing D (S1008) and correction processing B (S1005).

As mentioned in the description of FIG. 9, the setting of active paths is carried out on the basis of reception power of a CPICH from each base station, i.e. distances between the mobile station 101 and each base station. Hence, the mobile station 101 corrects or modifies the reception power of the CPICH in accordance with the respective priority levels and uses the corrected or modified reception power in the routine for setting active paths of S903 of FIG. 9, providing the setting of active paths that takes priority levels into account.

As a correction method, for example, a correction value that corresponds to the priority level may be added to the reception power of the CPICH. For example, a correction value of +2 dB may be employed for the correction processing C to obtain a corrected or modified CPICH reception power. Likewise, a correction value of +1 dB may be employed for the correction processing A, a correction value of +0 dB may be employed for the correction processing D, and a correction value of −1 dB may be employed for the correction processing B. The correction values are not limited the values described above.

Further, as another variation, it is possible to multiply the CPICH reception power by a correction value corresponding to the priority level. More specifically, for example, in the correction processing C a correction value of 1.1 dB may be employed as a value to be multiplied by the reception power of the CPICH; and likewise, a correction value of 1.05 may be employed for the correction processing A, a correction value of 1.0 may be employed for the correction processing D, and a correction value of 0.95 may be employed for the correction processing B. The correction values are not limited to the values described above.

The exemplary embodiment provide setting of the active paths that takes into account not only the CPICH reception power but also a movement state of a mobile station and which base station provides the best path for the mobile station, realizing a stable SHO.

Although four priority levels were employed in the above described embodiment, the mobile station may set the same first priority level on the correction processing A and the correction processing C, and may also set the same second priority on the correction processing B and the correction processing D. Actively including a base station providing the best path in the set of active paths may enhance the effect of this exemplary embodiment.

Embodiment 4

A fourth exemplary embodiment of the present invention will now be described. The fourth exemplary embodiment relates to setting a path (i.e., a base station) with which a mobile station performs transmit power control. In order to avoid redundant description, a description of parts same as those in the third exemplary embodiment of the present invention is omitted here and a description is given of only parts different to those in the third exemplary embodiment.

Figure 11:
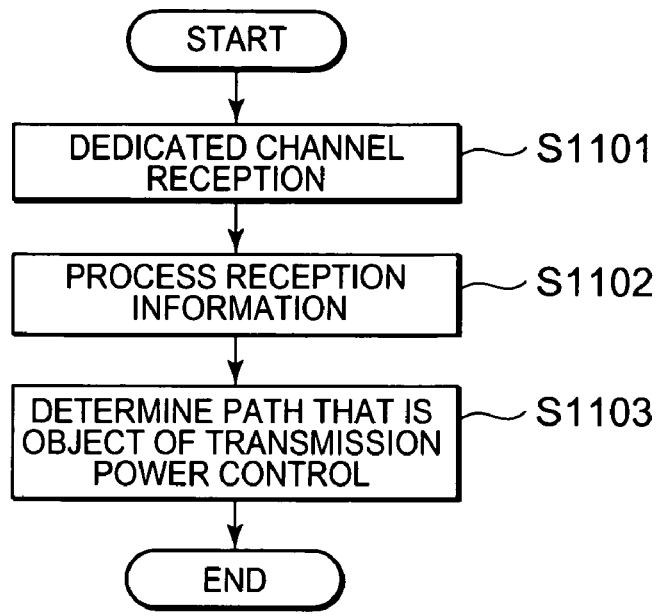
FIG. 11 shows a flowchart illustrating a determination of a transmit power control object according to a fourth embodiment.

The fourth exemplary embodiment will be described referring to FIG. 11. FIG. 11 is a flowchart illustrating a setting of a path (i.e., a base station) with which the mobile station 101 performs downlink transmit power control.

The mobile station 101 measures reception power of dedicated CHs transmitted from a plurality of base stations (S1101), and sets a path (a base station among the plurality of base station) with which the mobile station 101 performs downlink transmit power control based on information regarding the reception power of the dedicated CHs (S1103).

In S1103, the mobile station 101 sets the base station with the largest reception power of CPICH among the plurality base stations a path or a base station with which the mobile station 101 performs downlink transmission power control.

According to this exemplary embodiment, processing is added that modifies the reception strength of a dedicated CH (S1102) in addition to the processes described above. Hereunder, since the processing of S1102 is mostly the same as that of the third exemplary embodiment described in FIG. 10, only the correction processing from A to D is described here and other descriptions are omitted.

For this exemplary embodiment, unlike the setting of an active set described as the third exemplary embodiment, the priority levels descend in the order of correction processing D (S1008), correction processing C (S1007), correction processing B (S1006) and correction processing A (S1005).

The order of priority is based on the following idea. In order that the mobile station 101 performs transmit power control with a base station that is near, the mobile station sets the higher priority level on a base station that the mobile station 101 is approaching than a base station from which the mobile station 101 is moving away. Hence, the mobile station sets the higher priority level on the correction processing C and D than the correction processing A and B.

The correction processing A and the correction processing B will now be described. Since both correction processing A and B are performed with respect to a base station that the mobile station 101 is not approaching, there is a high possibility that sooner or later the base station will no longer provide the best path even if the base station provides the best path at present. Here, since the correction processing A is performed with respect to a base station providing the best path at present, the mobile station 101, in the correction process A, sets lower priority level on the base station so that the base station will get not to provide the best path soon. On the other hand, since the correction processing B is performed with respect to a base station that does not provide the best path at present, the mobile station 10, in the correction processing B, does not necessarily set the same low priority level as that for the correction processing A.

Next, the correction processing C and the correction processing D are described. Since both correction processing C and D are performed with respect to a base station that the mobile station is approaching, there is a high possibility that sooner or later the base station will provide the best path. Here, since the correction processing D is performed with respect to a base station that does not provide the best path at present, the mobile station 101, in the correction processing D, sets high priority level on the base station so that the base station will get to provide the best path. In contrast, since the correction processing C is performed with respect to a base station that already provides the best path at present, the mobile station 101, in the correction processing C, does not necessary set the same high priority level as that for the correction processing D.

Since the methods of correction in those correction processes A to D according to the fourth exemplary embodiment are the same as those of the third exemplary embodiment, a description of those is omitted here.

In the above description, the mobile station 101 modifies reception power of a dedication CH from each base station. However, the mobile station 101 may modify SIR of a dedicated CH from each base station. In this case, the mobile station may set a base station or path with which the mobile station performs downlink transmit power control based on the modified SIR.

The fourth exemplary embodiment provides setting of a path or a base station with which the mobile station 101 performs downlink transmit power control which takes into account a movement state of the mobile station 101 and a determination of which base station provides the best path at present, thereby realizing a stable SHO.

Embodiment 5

A fifth exemplary embodiment of the present invention will now be described. The fifth exemplary embodiment relates to transmit power control of an uplink from a mobile station to a base station. In order to avoid redundant description, a description of parts same as those in the third exemplary embodiment of this invention is omitted here and a description is provided of only parts that are different to those in the third exemplary embodiment. This embodiment is particularly effective in the case where a mobile station follows only TPC information for uplink transmit power control from a base station that provides the best path and does not follow TPC information for uplink transmit power control from other base stations.

Figure 12:
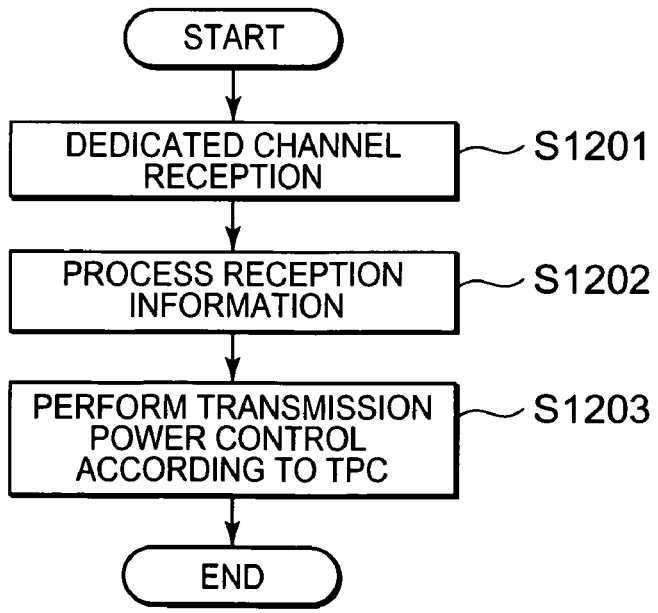
FIG. 12 shows a flowchart of transmit power control by TPC according to a fifth embodiment.

The fifth embodiment will be described referring to FIG. 12. The mobile station 101 measures reception power of dedicated CHs from a plurality of base stations (S1201) and performs uplink transmit power control based on that information regarding the reception power (S1203). In S1203, the mobile station 101 performs uplink transmit power control based on TPC information received from a base station with the largest reception power of a dedicated CH among the plurality of base stations.

According to this exemplary embodiment, processing is added that modifies the reception power of a dedicated CH in addition to the processing described above (S1202). Hereunder, since the processing of S1202 is mainly the same as that of the third exemplary embodiment as described in FIG. 10, only the correction processing from A to D is described here and other descriptions are omitted.

For this embodiment also, similarly to the setting of a path or a base station with which the mobile station 101 performs downlink transmission power control described as the fourth exemplary embodiment, the priority levels descend in the order of correction processing D (S1008), correction processing C (S1007), correction processing B (S1006) and correction processing A (S1005).

The order of priority is based on the following idea. In order that the mobile station 101 performs uplink transmit power control with a base station that is near the mobile station 101, the mobile station 101 sets a higher priority level on a base station that the mobile station 101 is approaching than a base station from that the mobile station 101 is moving away. Hence, the mobile station 101 sets higher priority level on the correction processing C and D than the correction processing A and B.

The correction processing A and the correction processing B are now described. Since both correction processing A and B are performed with respect to a base station that the mobile station 101 is not approaching, there is a high possibility that sooner or later the base station will get not provide the best path even if the base station provide the best path at present. Furthermore, since the correction processing A is performed with respect to a base station providing the best path at present, the mobile station 101, in the correction process A, sets a low priority for the base station so that the base station will not provide the best path. In contrast, since the correction processing B is performed with respect to a base station that does not provide the best path at present, the mobile station 101, in the correction processing B, does not necessarily set the same low priority as that for the correction processing A.

Next, the correction processing C and the correction processing D are described. Since both correction processing C and D are performed with respect to a base station that the mobile station is approaching, there is a high possibility that sooner or later the base station will provide the best path even if the base station does not provide the best path at present. Furthermore, since the correction processing D is performed with respect to a base station that does not provide the best path at present, the mobile station 101, in the correction processing D, sets high priority on the base station so that the base station will get to provide the best path. In contrast, since the correction processing C is performed with respect to a base station providing the best path at present, the mobile station 101, in the correction processing C, does not necessarily set the same high priority as that for the correction processing D.

Since the methods of correction in correction processing A to D are the same as those of the third exemplary embodiment, a description of these is omitted here.

In the above description, the mobile station 101 modifies reception power of a dedicated CH from each base station. However, the mobile station 101 may modify SIR of a dedicated CH from each base station. In this case, the mobile station may set a base station or path with which the mobile station performs uplink transmit power control based on the modified SIR.

The fifth exemplary embodiment provides setting of a path that or a base station with which the mobile station 101 performs uplink transmit power control which takes into account a movement state of the mobile station 101 and a determination of which base station provides the best path at present, realizing a stable SHO.

Various variations can also be implemented for the present invention in addition to the above described embodiments. For example, an integrated the transmitter (204, 805) and receiver (205, 804) may apply to the functional blocks of the base station of FIG. 2 or the mobile station of FIG. 8 Further, the function block may be implemented partially or wholly with a software.

In addition to the description above, an exemplary embodiment of the present invention is to control the risk of a call disconnection due to the power drift described above thus realize a satisfactory SHO.

Another exemplary embodiment of the present invention is to prevent a decrease in a capacity of a base station due to the power drift described above.

A further exemplary embodiment of the present invention is to minimize changes with respect to transmit power control methods that have been carried out conventionally and prevent disadvantages relating to power drift to realize a satisfactory SHO.

A further exemplary embodiment of the present invention is to facilitate a shift from the current technology to the technology of the present invention by minimizing changes with respect to transmit power control methods that have been carried out conventionally.

A still further exemplary embodiment of the present invention is to provide a more stable transmit power control method during a SHO in that one mobile station is connected to a plurality of base stations, by performing transmit power control that takes into account information regarding power of a CPICH that is a criterion for the SHO.

A further exemplary embodiment of the present invention is to prevent a mobile station from performing transmit power control with a distant base station during a SHO even though there is a base station in a nearby location.

According to an exemplary embodiment, it is possible to control the downlink transmit power of a base station to maintain a high level of power when a mobile station is approaching the base station and to prevent the occurrence of transmit power control with a distant base station. Thus, the occurrence of a sudden communication disconnection accompanying a SHO in a CDMA mobile communication system can be prevented.

Further, since downlink transmission power of a relevant base station is increased by necessary amount when a mobile station is approaching and transmission power of other base stations is no longer needlessly increased, the effect of preventing the transmission power of base stations increases in accordance with the number of base stations that exist in the vicinity of the mobile station.

In addition, since synchronization of downlink signals at the mobile station is facilitated by the transmit power control of the base station, a favorable communication quality can be maintained.

Furthermore, since an exemplary embodiment can also be implemented by performing only transmit power control and operations at a base station or a mobile station, it is possible to prevent an increase in the processing load of a base station or a mobile station.

Further, since the effect of an exemplary embodiment can be exerted even if this function is continually maintained in an active state regardless of whether a SHO is in progress or not, few changes are required to a control method at a base station and the control can be easily implemented.

Although the exemplary embodiments of the present invention have been described above, it will be understood by those skilled in the art that the present invention should not be limited to the described preferred embodiment, but various changes and modifications can be made within the spirit and the scope of the present invention.

What is claimed is:

1. A method for a communication network in which a mobile station transmits and receives wireless signals to and from a plurality of base stations, the method comprising:
    detecting movement of the mobile station;
    determining whether a reception quality of a wireless signal transmitted from a base station among the plurality of base stations in communication with the mobile station provides a best reception quality compared to reception qualities of other base stations in communication with the mobile station; and
    determining, based on the detected movement and the determination of the best reception quality, whether to modify a transmit power control of the base station,
    wherein the transmit power control instructs an increase or decrease of transmit power of the base station in accordance with a control step value, said control step value being a value of incremental change of transmit power that is increased or decreased when the transmit power control is modified,
    wherein the control step value of the transmit power control is modified when both the detection of movement indicates the mobile station is not approaching the base station and the determination of the best reception quality indicates the reception quality of the wireless signal transmitted from the base station does not provide the best reception quality.

2. The method according to claim 1,
    wherein the control step value of the transmit power control instructs the increase or decrease of transmit power by at least increasing the transmit power by a first predetermined control step or decreasing the transmit power by a second predetermined control step;
    wherein at least one of the first and second predetermined control steps of the transmit power control is increased or decreased if both the detection of movement indicates the mobile station is not approaching the base station and the determination of the best reception quality indicates the reception quality of the wireless signal transmitted from the base station does not provide the best reception quality.

3. The method according to claim 2, further comprising:
    increasing the transmit power if the base station receives a first predetermined number of transmit power control signals requesting to increase the transmit power in sequence and decreasing the transmit power if the base station receives a second predetermined number of transmit power control signals requesting to decrease the transmit power in sequence, the second predetermined number being equal to or more than the first predetermined number.

4. The method according to claim 1, wherein the transmit power control is modified if the mobile station approaches the base station.

5. The method according to claim 1, wherein the detecting the movement comprises detecting whether the mobile station approaches the base station.

6. The method according to claim 5, wherein the movement of the mobile station is detected based on at least one of:
    reception timing of a wireless signal from the mobile station;
    distances from the mobile station to a respective base station;
    positional information of the mobile station obtained by using a satellite based positioning system; and
    reception power at the mobile station of a pilot signal which is transmitted by the base station at fixed transmit power.

7. The method according to claim 2, wherein the at least one of the predetermined control steps of the transmit power control are not modified if the detection of movement indicates the mobile station is approaching the base station and the determination of the best reception quality indicates the reception quality of the wireless signal transmitted from the base station does provide the best reception quality.

8. The method according to claim 1, further comprising determining whether the mobile station is in a soft handover state, wherein the transmit power control is not modified if the mobile station is determined not to be in the soft handover state.

9. The method according to claim 2, wherein the determination of the reception quality is based on at least one of:
    a notification, transmitted from the mobile station, that the reception quality is the highest value among the reception qualities;
    information regarding the reception quality transmitted from the mobile station; and
    whether the mobile station controls transmit power of a wireless signal transmitted to the base station based on transmit power control signal transmitted to the mobile station from the base station.

10. A base station in a communication network in which a mobile station transmits and receives wireless signals to and from a plurality of base stations, the base station comprising:
    a transmitter which transmits a wireless signal to the mobile station;

a receiver which receives a transmit power control signal from the mobile station, the transmit power control signal requesting to increase or decrease transmit power of the wireless signal; and a controller, coupled to the transmitter and the receiver, which:

detects movement of a mobile station;

determines whether a reception quality of a wireless signal transmitted from the base station among the plurality of base stations in communication with the mobile station provides a best reception quality compared to reception qualities of other base stations in communication with the mobile station; and determines, based on the detected movement and the determination of the best reception quality, whether to modify a transmit power control of the base station, wherein the transmit power control instructs an increase or decrease of transmit power of the base station in accordance with a control step value, said control step value being a value of incremental change of transmit power that is increased or decreased when the transmit power control is modified, wherein the control step value of the transmit power control is modified when both the detection of movement indicates the mobile station is not approaching the base station and the determination of the best reception quality indicates the reception quality of the wireless signal transmitted from the base station does not provide the best reception quality.

11. The base station according to claim 10, wherein the control step value of the transmit power control instructs the controller increase or decrease of transmit power by at least increasing the transmit power by a first predetermined control step or decreasing the transmit power by a second predetermined control step;

wherein at least one of the first and second predetermined control steps of the transmit power control is increased or decreased if both the detection of movement indicates the mobile station is not approaching the base station and the determination of the best reception quality indicates the reception quality of the wireless signal transmitted from the base station does not provide the best reception quality.

12. The base station according to claim 11, wherein the controller increases the transmit power if the base station receives a first predetermined number of transmit power control signals requesting to increase the transmit power in sequence and decreasing the transmit power if the base station receives a second predetermined number of transmit power control signals requesting to decrease the transmit power in sequence, the second predetermined number being equal to or more than the first predetermined number.

13. The base station according to claim 10, wherein the controller modifies the transmit power control if the mobile station approaches the base station.

14. The base station according to claim 10, wherein the controller detects whether the mobile station approaches the base station in the detection of the movement.

15. The base station according to claim 14, wherein the movement of the mobile station is detected based on at least one of:

reception timing of a wireless signal from the mobile station;

distances from the mobile station to the respective base station;

positional information of the mobile station obtained by using a satellite based positioning system; and reception power at the mobile station of a pilot signal transmitted by the base station at fixed transmit power.

16. The base station according to claim 11, wherein the at least one of the predetermined control steps of the transmit power control are not modified if the detection of movement indicates the mobile station is approaching the base station and the determination of the best reception quality indicates the reception quality of the wireless signal transmitted from the base station does provide the best reception quality.

17. The base station according to claim 11, wherein the controller fu determines whether the mobile station is in a soft handover state, wherein the transmit power control is not modified if the mobile station is determined not to be in the soft handover state.

18. The base station according to claim 11, wherein the controller performs the determination of the reception quality based on at least one of:

a notification, transmitted from the mobile station, that the reception quality is the highest value among the reception qualities;

information regarding the reception quality transmitted the mobile station; and whether the mobile station controls transmit power of a wireless signal transmitted to the base station based on a transmit power control signal transmitted to the mobile station from the base station.

19. A base station in a communication network in which a mobile station transmits and receives wireless signals to and from a plurality of base stations, the base station comprising:

transmitting means for transmitting a wireless signal to the mobile station;

receiving means for receiving a transmit power control signal from the mobile station, the transmit power control signal requesting increase or decrease of transmit power of the wireless signal;

means, coupled to the transmitting means and the receiving means, for detecting movement of a mobile station;

means, coupled to the transmitting means and the receiving means, for determining whether a reception quality of a wireless signal transmitted from the base station among the plurality of base stations in communication with the mobile station provides a best reception quality compared to reception qualities of other base stations in communication with the mobile station; and means, for determining, based on the detected movement and the determination of the best reception quality, whether to modify the transmit power control, wherein the transmit power control instructs an increase or decrease of transmit power of the base station in accordance with a control step value, said control step value being a value of incremental change of transmit power that is increased or decreased when the transmit power control is modified, wherein the control step value of the transmit power control is modified when both the detection of movement indicates the mobile station is not approaching the base station and the determination of the best reception quality indicates the reception quality of the wireless signal transmitted from the base station does not provide the best reception quality.

20. The base station according to claim 19, wherein the control step value of the transmit power control instructs the increase or decrease of transmit power by at least increasing the transmit power by a first predetermined control step or decreasing the transmit power by a second predetermined control step;

wherein at least one of the first and second predetermined control steps of the transmit power control is modified if both the detection of movement indicates the mobile station is not approaching the base station and the determination of the best reception quality indicates the reception quality of the wireless signal transmitted from the base station does not provide the best reception quality.

21. The base station according to claim 19, wherein the transmit power is increased if the base station receives a first predetermined number of transmit power control signals requesting to increase the transmit power in sequence and decreasing the transmit power if the base station receives a second predetermined number of transmit power control signals requesting to decrease the transmit power in sequence, the second predetermined number being equal to or more than the first predetermined number.

22. The method according claim 1, wherein the transmit power of the base station is modified in response to a sequence of transmit power control instructions, wherein the control step values of the transmit power control instructions are modified in response to the detection of movement indicating the mobile station is not approaching the base station and determining the best reception quality indicates the reception quality of the wireless signal transmitted from the base station does not provide the best reception quality.

23. The base station according to claim 10, wherein the transmit power of the base station is modified in response to a sequence of transmit power control instructions, wherein the control step values of the transmit power control instructions are modified in response to the detection of movement indicating the mobile station is not approaching the base station and determining the best reception quality indicates the reception quality of the wireless signal transmitted from the base station does not provide the best reception quality.

24. The base station according to claim 19, wherein the transmit power of the base station is modified in response to a sequence of transmit power control instructions, wherein the control step values of the transmit power control instructions are modified in response to the detection of movement indicating the mobile station is not approaching the base station and determining the best reception quality indicates the reception quality of the wireless signal transmitted from the base station does not provide the best reception quality.

* * * * *